(12) United States Patent
Sakaguchi et al.

(10) Patent No.: US 11,897,333 B2
(45) Date of Patent: Feb. 13, 2024

(54) HARVESTING MACHINE HAVING A TRAVEL DISTANCE LIMIT CALCULATION PROGRAM

(71) Applicant: Kubota Corporation, Osaka (JP)

(72) Inventors: Kazuo Sakaguchi, Amagasaki (JP); Tomohiko Sano, Amagasaki (JP); Osamu Yoshida, Amagasaki (JP); Satoshi Maruo, Amagasaki (JP); Takashi Nakabayashi, Sakai (JP)

(73) Assignee: Kubota Corporation, Osaka (JP)

( * ) Notice: Subject to any disclaimer, the term of this patent is extended or adjusted under 35 U.S.C. 154(b) by 528 days.

(21) Appl. No.: 16/764,014

(22) PCT Filed: Nov. 22, 2018

(86) PCT No.: PCT/JP2018/043142
§ 371 (c)(1),
(2) Date: May 14, 2020

(87) PCT Pub. No.: WO2019/103089
PCT Pub. Date: May 31, 2019

(65) Prior Publication Data
US 2020/0331347 A1     Oct. 22, 2020

(30) Foreign Application Priority Data

Nov. 24, 2017 (JP) .................................. 2017-225544
Nov. 24, 2017 (JP) .................................. 2017-225545
Dec. 21, 2017 (JP) .................................. 2017-245498

(51) Int. Cl.
*A01D 41/127*     (2006.01)
*B60K 31/00*      (2006.01)
(Continued)

(52) U.S. Cl.
CPC .......... *B60K 31/00* (2013.01); *A01D 41/1208* (2013.01); *A01D 41/1217* (2013.01);
(Continued)

(58) Field of Classification Search
CPC ............ A01D 41/1275; A01D 41/1278; A01D 41/1208; A01D 41/00–41/16; A01F 12/60
See application file for complete search history.

(56) References Cited

U.S. PATENT DOCUMENTS 5,327,708 A * 7/1994 Gerrish .............. A01D 41/1277
460/7
9,372,109 B2 * 6/2016 Acheson ................ G01G 21/23
(Continued)

FOREIGN PATENT DOCUMENTS

| CN | 106163259 A |    | 11/2016 |           |
|----|-------------|----|---------|-----------|
| CN | 107521293 A | *  | 12/2017 | ........... A01D 46/085 |

(Continued)

*Primary Examiner* — Adam J Behrens
*Assistant Examiner* — Madeline I Runco
(74) *Attorney, Agent, or Firm* — The Webb Law Firm

(57) ABSTRACT

A harvester includes: a crop tank that stores a crop harvested by a harvesting device; a weight detection unit that detects a storage weight, which is a value indicating the weight of the crop stored in the crop tank; a maximum weight calculation unit that calculates a maximum weight, which is a value indicating the weight of the crop at the maximum storage amount of the crop tank; a unit harvest weight calculation unit calculates a unit harvest weight that indicates the weight of the crop harvested per unit of harvest-travel distance; and a maximum travel distance calculation unit that calculates a maximum travel distance, which is the maximum distance that can be traveled during traveling harvesting before the amount of the crop stored in the crop (Continued)

tank reaches the maximum storage amount, based on the storage weight, the maximum weight, and the unit harvest weight.

1 Claim, 18 Drawing Sheets

(51) Int. Cl.
*A01D 41/12* (2006.01)
*A01F 12/60* (2006.01)

(52) U.S. Cl.
CPC ..... *A01D 41/1272* (2013.01); *A01D 41/1275* (2013.01); *A01D 41/1278* (2013.01); *A01F 12/60* (2013.01); *B60Y 2200/222* (2013.01); *B60Y 2300/02* (2013.01)

(56) References Cited

U.S. PATENT DOCUMENTS

| | | | | |
|---|---|---|---|---|
| 2003/0080753 | A1* | 5/2003 | Rains | A01D 41/1208 |
| | | | | 324/643 |
| 2010/0285855 | A1* | 11/2010 | Chervenka | A01D 41/1275 |
| | | | | 460/119 |
| 2011/0213531 | A1* | 9/2011 | Farley | A01D 41/1275 |
| | | | | 701/50 |
| 2012/0253611 | A1* | 10/2012 | Zielke | A01D 41/1275 |
| | | | | 701/50 |
| 2015/0377690 | A1 | 12/2015 | Phelan et al. | |
| 2016/0029559 | A1* | 2/2016 | Inoue | A01D 41/1208 |
| | | | | 56/10.2 J |
| 2016/0335892 | A1 | 11/2016 | Okada et al. | |
| 2017/0208742 | A1* | 7/2017 | Ingibergsson | G01F 23/284 |
| 2018/0177125 | A1* | 6/2018 | Takahara | A01D 41/127 |

FOREIGN PATENT DOCUMENTS

| | | | | |
|---|---|---|---|---|
| EP | 2944178 A1 | * | 11/2015 | ......... A01D 41/1275 |
| JP | 57420 A | | 1/1993 | |
| JP | 200169836 A | | 3/2001 | |
| JP | 20048053 A | | 1/2004 | |
| JP | 2006254725 A | | 9/2006 | |
| JP | 200989651 A | | 4/2009 | |
| JP | 4887577 B2 | | 12/2011 | |
| JP | 2014177764 A | * | 9/2014 | |
| JP | 2014177764 A | | 9/2014 | |
| JP | 2015170223 A | | 9/2015 | |
| JP | 2015170233 A | | 9/2015 | |
| JP | 2015198577 A | | 11/2015 | |
| JP | 201629927 A | | 3/2016 | |
| JP | 2017163541 A | | 9/2017 | |
| WO | WO-2015133585 A1 | * | 9/2015 | ........... A01B 69/008 |

* cited by examiner

HARVESTING MACHINE HAVING A TRAVEL DISTANCE LIMIT CALCULATION PROGRAM

CROSS-REFERENCE TO RELATED APPLICATIONS

This application is the United States national phase of International Application No. PCT/JP2018/043142 filed Nov. 22, 2018, and claims priority to Japanese Patent Application Nos. 2017-225544 and 2017-225545 filed Nov. 24, 2017, and Japanese Patent Application No. 2017-245498 filed Dec. 21, 2017, the disclosures of which are hereby incorporated by reference in their entirety.

TECHNICAL FIELD

The present invention relates to a harvester that includes a harvesting device for harvesting a crop in a field and a traveling device.

The present invention also relates to an agricultural work vehicle that travels in a field.

The present invention further relates to a combine control system for controlling a combine having a grain tank for storing a grain.

BACKGROUND ART

[1] The technology disclosed in Patent Document 1 is known as an example of the aforementioned harvester. This harvester ("combine" in Patent Document 1) can perform traveling harvesting in which a crop in a field is harvested with use of a harvesting device ("reaping device" in Patent Document 1) while traveling with use of a traveling device. Also, the harvester includes a crop tank ("grain tank" in Patent Document 1) for storing the crop harvested by the harvesting device.

The harvester is configured to travel autonomously based on signals received from GPS satellites, and also includes a grain amount detecting means for detecting the amount of grain in the crop tank. If the detected value obtained by the grain amount detecting means is greater than or equal to a set value, the harvester interrupts the reaping operation and automatically moves to a location near a truck in order for the grain to be discharged from the crop tank.

[2] The technology disclosed in Patent Document 1 is known as an example of the aforementioned agricultural work vehicle. This agricultural work vehicle ("combine" in Patent Document 1) is configured to autonomously travel in a field based on signals from GPS satellites, and includes a grain amount detecting means for detecting the amount of grain in a grain tank. If the detected value obtained by the grain amount detecting means is greater than or equal to a set value, the agricultural work vehicle interrupts the reaping operation and automatically moves to a location near a truck in order for the grain to be discharged from the grain tank.

[3] One invention disclosed in Patent Document 1 is a combine that includes a grain tank for storing grains. This combine is configured to perform harvesting work in a field by traveling autonomously.

Also, the combine includes a grain amount sensor for detecting the amount of grain in a grain tank. If the amount of grain in the grain tank is greater than or equal to a set value, the combine automatically moves to a location near a truck in order for the grain to be discharged. Note that the truck is parked outside the field.

PRIOR ART DOCUMENTS

Patent Documents

Patent Document 1: JP 2001-69836A

DISCLOSURE OF THE INVENTION

Problem to be Solved by the Invention

[1] The Following are Issues Corresponding to Background Art [1].

In the harvester described in Patent Document 1, a worker cannot know the maximum distance that the harvester can travel during traveling harvesting before the amount of grain in the crop tank reaches the maximum storage amount. The worker therefore cannot find out the grain discharge timing in advance, thus making it difficult to make an effective work plan that includes a preparation operation for preparing for grain discharge.

An object of the present invention is to provide a harvester that makes it possible to calculate the maximum distance that can be traveled during traveling harvesting before the amount of crop stored in the crop tank reaches the maximum storage amount.

[2] The Following are Issues Corresponding to Background Art [2].

In the case of an agricultural work vehicle that travels in a field such as the agricultural work vehicle described in Patent Document 1, depending on the characteristics of the field surface, problems may sometimes occur such as slipping or a large amount of rocking of the vehicle body during turning.

For example, an agricultural work vehicle tends to slip when turning at a wet location in a field. Also, when an agricultural work vehicle turns in a ridged field, the vehicle body tends to rock a large amount due to the unevenness of the field surface.

An object of the present invention is to provide an agricultural work vehicle that suppresses problems that occur during turning due to the characteristics of the field surface.

[3] The Following are Issues Corresponding to Background Art [3].

Generally, a combine performs harvesting work in a field by repeatedly performing traveling reaping in an unreaped area of the field and making traveling turns in a reaped area. Here, if a relatively large amount of grain is stored in the grain tank, the turning precision of the combine may sometimes decrease due to slipping caused by centrifugal force or sinking of the chassis, for example. Note that turning precision refers to how small the deviation of the actual turning track from the planned turning path is.

In the case of the combine described in Patent Document 1, even if the turning precision decreases due to a relatively large amount of grain being stored in the grain tank, the combine continues to travel until the amount of grain in the grain tank is greater than or equal to a set value. In this case, the combine continues to travel with a low turning precision. The turning path in the reaped area thus tends to greatly diverge from the planned turning path. As a result, it is envisioned that reaping in the unreaped area will become inefficient, and unreaped areas will remain, for example.

Also, even in the case where the combine is manually operated, if the combine continues to travel with a lower turning precision, it is envisioned that reaping in the unreaped area will become inefficient, and unreaped areas will remain, for example, similarly to the case described above.

An object of the present invention is to provide a combine control system that is likely to ensure the turning precision of the combine.

Means for Solving Problem

[1] The Following is a Means for Solving the Problems Corresponding to Issue [1].

A feature of the present invention is a harvester that includes a harvesting device for harvesting a crop in a field and a traveling device, and that is capable of performing traveling harvesting in which the crop in the field is harvested with use of the harvesting device while traveling with use of the traveling device, the harvester including:
- a crop tank configured to store the crop harvested by the harvesting device;
- a weight detection unit configured to detect a storage weight, which is a value that indicates a weight of the crop stored in the crop tank;
- a maximum weight calculation unit configured to calculate a maximum weight, which is a value that indicates a weight of the crop at a maximum storage amount of the crop tank;
- a unit harvest weight calculation unit configured to calculate a unit harvest weight, which is a weight of the crop harvested per unit of harvest-travel distance; and
- a maximum travel distance calculation unit configured to calculate a maximum travel distance, which is a maximum distance that can be traveled during the traveling harvesting before the amount of the crop stored in the crop tank reaches the maximum storage amount, based on the storage weight detected by the weight detection unit, the maximum weight calculated by the maximum weight calculation unit, and the unit harvest weight calculated by the unit harvest weight calculation unit.

According to the present invention, the storage weight, which is a value indicating the weight of the crop stored in the crop tank, is detected by the weight detection unit. Also, the maximum weight, which is a value indicating the weight of the crop at the maximum storage amount of the crop tank, is calculated by the maximum weight calculation unit. Furthermore, the unit harvest weight, which is the weight of the crop harvested per unit of harvest-travel distance, is calculated by the unit harvest weight calculation unit.

Then, by dividing the difference between the maximum weight and the storage weight at the current time by the unit harvest weight, it is possible to calculate the maximum travel distance, which is the maximum distance that can be traveled during traveling harvesting before the amount of the crop stored in the crop tank reaches the maximum storage amount.

In other words, according to the present invention, it is possible to calculate the maximum distance that can be traveled during traveling harvesting before the amount of the crop stored in the crop tank reaches the maximum storage amount.

Further, in the present invention, it is preferable that the harvester further includes:
- an accumulation height detection unit configured to detect an accumulation height of the crop stored in the crop tank,
- wherein the maximum weight calculation unit calculates the maximum weight based on the storage weight detected by the weight detection unit and the accumulation height detected by the accumulation height detection unit.

In the case where the harvester calculates the maximum travel distance based on the storage weight, the maximum weight, and the unit harvest weight, a configuration is conceivable in which the maximum weight is determined through experimentation and stored instead of being calculated. In this case, in the experimentation stage, the maximum weight can be determined by measuring the weight of the crop stored in the crop tank when the amount of the crop is at the maximum storage amount of the crop tank.

However, the weight of the crop at the maximum storage amount changes depending on the moisture content of the crop. For this reason, if the moisture content of the crop is different between the experimentation stage and the actual harvesting work, and the maximum travel distance is calculated based on the maximum weight that was determined through experimentation, then the calculation of the maximum travel distance is likely to be imprecise.

Here, according to the above configuration, the maximum weight is calculated based on the storage weight and the accumulation height of the crop stored in the crop tank. For example, if it is detected that the accumulation height is 50% of the maximum value, the maximum weight can be calculated precisely by multiplying the storage weight at that time by 2.

Therefore, according to this configuration, it is possible to avoid the case where the calculation of the maximum travel distance becomes imprecise as described above.

Further, in the present invention, it is preferable that the harvester further includes:
- a moisture detection unit configured to detect a moisture content of the crop harvested by the harvesting device,
- wherein the maximum weight calculation unit calculates the maximum weight based on the moisture content detected by the moisture detection unit.

As described above, the weight of the crop at the maximum storage amount changes depending on the moisture content of the crop. Here, it is conceivable to create a map that indicates the relationship between the weight of the crop at the maximum storage amount and the moisture content of the crop by experimentally finding the relationship between the weight of the crop at the maximum storage amount and the moisture content of the crop.

Here, according to the above configuration, it is possible to realize a configuration in which, by using the map that indicates the relationship between the weight of the crop at the maximum storage amount and the moisture content of the crop, the maximum weight is calculated based on the moisture content detected by the moisture detection unit. The maximum weight can therefore be calculated precisely.

Moreover, according to the above configuration, it is not necessary to detect the accumulation height of the crop stored in the crop tank in order to calculate the maximum weight. Therefore, according to the above configuration, the maximum weight can be calculated precisely even if the harvester does not include the accumulation height detection unit.

Another feature of the present invention is a maximum travel distance calculation program for causing a computer to execute:
- a weight detection function of detecting a storage weight, which is a value that indicates a weight of a crop stored in a crop tank of a harvester, the harvester including a harvesting device for harvesting the crop in a field and a traveling device, the harvester being capable of performing traveling harvesting in which the crop in the field is harvested with use of the harvesting device while traveling with use of the traveling device, and the harvester further including the crop tank that stores the crop harvested by the harvesting device;

a maximum weight calculation function of calculating a maximum weight, which is a value that indicates a weight of the crop at a maximum storage amount of the crop tank;

a unit harvest weight calculation function of calculating a unit harvest weight, which is a weight of the crop harvested per unit of harvest-travel distance; and a maximum travel distance calculation function of calculating a maximum travel distance, which is a maximum distance that the harvester can travel during the traveling harvesting before the amount of the crop stored in the crop tank reaches the maximum storage amount, based on the storage weight detected by the weight detection function, the maximum weight calculated by the maximum weight calculation function, and the unit harvest weight calculated by the unit harvest weight calculation function.

Another feature of the present invention is a recording medium having recorded thereon a maximum travel distance calculation program for causing a computer to execute:

a weight detection function of detecting a storage weight, which is a value that indicates a weight of a crop stored in a crop tank of a harvester, the harvester including a harvesting device for harvesting the crop in a field and a traveling device, the harvester being capable of performing traveling harvesting in which the crop in the field is harvested with use of the harvesting device while traveling with use of the traveling device, and the harvester further including the crop tank that stores the crop harvested by the harvesting device;

a maximum weight calculation function of calculating a maximum weight, which is a value that indicates a weight of the crop at a maximum storage amount of the crop tank;

a unit harvest weight calculation function of calculating a unit harvest weight, which is a weight of the crop harvested per unit of harvest-travel distance; and a maximum travel distance calculation function of calculating a maximum travel distance, which is a maximum distance that the harvester can travel during the traveling harvesting before the amount of the crop stored in the crop tank reaches the maximum storage amount, based on the storage weight detected by the weight detection function, the maximum weight calculated by the maximum weight calculation function, and the unit harvest weight calculated by the unit harvest weight calculation function.

Another feature of the present invention is a maximum travel distance calculation method including:

a weight detection step of detecting a storage weight, which is a value that indicates a weight of a crop stored in a crop tank of a harvester, the harvester including a harvesting device for harvesting the crop in a field and a traveling device, the harvester being capable of performing traveling harvesting in which the crop in the field is harvested with use of the harvesting device while traveling with use of the traveling device, and the harvester further including the crop tank that stores the crop harvested by the harvesting device;

a maximum weight calculation step of calculating a maximum weight, which is a value that indicates a weight of the crop at a maximum storage amount of the crop tank;

a unit harvest weight calculation step of calculating a unit harvest weight, which is a weight of the crop harvested per unit of harvest-travel distance; and a maximum travel distance calculation step of calculating a maximum travel distance, which is a maximum distance that the harvester can travel during the traveling harvesting before the amount of the crop stored in the crop tank reaches the maximum storage amount, based on the storage weight detected in the weight detection step, the maximum weight calculated in the maximum weight calculation step, and the unit harvest weight calculated in the unit harvest weight calculation step.

[2] The Following is a Means for Solving the Problems Corresponding to Issue [2].

A feature of the present invention is the inclusion of;

an information acquisition unit configured to acquire field surface information that indicates a characteristic of a field surface; and a turning speed control unit configured to control a turning speed based on the field surface information acquired by the information acquisition unit.

According to the present invention, it is possible to control the turning speed of the agricultural work vehicle according to a characteristic of the field surface. This therefore suppresses problems that occur during turning due to characteristics of the field surface.

Also, in the present invention, it is preferable that the field surface information includes information that indicates a wet location tendency at positions in a field, and the turning speed control unit sets the turning speed lower in a case of making a traveling turn at a position where the wet location tendency is relatively high than in a case of making a traveling turn at a position where the wet location tendency is relatively low.

According to this configuration, the agricultural work vehicle turns at a relatively low speed in the case of making a turn at a location that has a high wet location tendency in the field. Slipping is therefore less likely to occur.

Also, in the present invention, it is preferable that the field surface information includes information that indicates whether or not the field is a ridged field, and the turning speed control unit sets the turning speed lower in a case of traveling in a ridged field than in a case of traveling in a field that is not a ridged field.

According to this configuration, the agricultural work vehicle turns at a relatively low speed in the case of making a turn in a ridged field. Accordingly, it is possible to mitigate rocking of the vehicle body caused by unevenness of the field surface.

Also, in the present invention, it is preferable that the information acquisition unit is configured to be capable of communicating with a management server that manages the agricultural work vehicle, and the information acquisition unit acquires the field surface information from the management server.

In the case where the agricultural work vehicle includes the information acquisition unit that acquires field surface information indicating a characteristic of the field surface and the turning speed control unit that controls the turning speed based on the field surface information acquired by the information acquisition unit, it is conceivable for the agricultural work vehicle to also be provided with a detection device for detecting a characteristic of the field surface. In this case, the detection result obtained by the detection device is the field surface information, and the information acquisition unit can acquire the field surface information by receiving the detection result from the detection device.

However, in this case, the agricultural work vehicle needs to include the detection device, and this tends to increase the manufacturing cost of the agricultural work vehicle.

Here, according to the above configuration, the information acquisition unit acquires the field surface information from the management server. The agricultural work vehicle therefore does not need to include a detection device such as that described above.

Therefore, according to the above configuration, it is possible to suppress an increase in the manufacturing cost of the agricultural work vehicle.

Another feature of the present invention is a turning control program for causing a computer to execute:
  an information acquisition function of acquiring field surface information that indicates a characteristic of a field surface; and
  a turning speed control function of controlling a turning speed of an agricultural work vehicle based on the field surface information acquired by the information acquisition function.

Another feature of the present invention is a recording medium having recorded thereon a turning control program for causing a computer to execute:
  an information acquisition function of acquiring field surface information that indicates a characteristic of a field surface; and
  a turning speed control function of controlling a turning speed of an agricultural work vehicle based on the field surface information acquired by the information acquisition function.

Another feature of the present invention is a turning control method including:
  an information acquisition step of acquiring field surface information that indicates a characteristic of a field surface; and
  a turning speed control step of controlling a turning speed of an agricultural work vehicle based on the field surface information acquired in the information acquisition step.

[3] The Following is a Means for Solving the Problems Corresponding to Issue [3].

A feature of the present invention is a combine control system for controlling a combine having a grain tank that stores a grain, the combine control system including:
  a detection unit configured to detect that a storage weight of the grain in the grain tank has reached a maximum value;
  an acquisition unit configured to acquire turning precision information that indicates a turning precision of the combine;
  a determination unit configured to determine whether or not the turning precision of the combine has decreased, based on the turning precision information acquired by the acquisition unit; and
  a maximum value reducing unit configured to reduce the maximum value if the determination unit determines that the turning precision of the combine has decreased.

According to the present invention, if the turning precision of the combine has decreased, the maximum value reducing unit reduces the maximum value of the storage weight of grain in the grain tank. Accordingly, the storage weight of grain in the grain tank is less likely to rise to a weight at which the turning precision decreases. In other words, after reducing the maximum value of the storage weight of grain in the grain tank, the turning precision of the combine is likely to be ensured.

Therefore, according to the present invention, the turning precision of the combine is likely to be ensured.

Also, in the present invention, it is preferable that
  the acquisition unit is configured to acquire a first retry count that indicates the number of retries performed by the combine on one turning path, and
  the determination unit determines that the turning precision of the combine has decreased if the storage weight of the grain in the grain tank is greater than or equal to a predetermined weight, and furthermore the first retry count has reached a predetermined first value.

If the position of the combine deviates outward from the planned turning path when making a turn, it is sometimes possible to return to the planned turning path by performing one or more retries.

Here, it is conceivable to count the cumulative number of retries in harvesting work in a field, and determine that the turning precision of the combine has decreased if the cumulative number of retries is greater than or equal to a predetermined threshold value.

However, with this configuration, even if the number of retries on one turning path is relatively low and there is no need to reduce the maximum value of the grain storage weight, the cumulative number of retries continues to increase as operations continue. If the cumulative number of retries reaches the predetermined threshold value, it ends up being determined that the turning precision of the combine has decreased.

Accordingly, it is possible to envision a situation in which, regardless of the fact that there is no need to reduce the maximum value of the grain storage weight, it is determined that the turning precision of the combine has decreased, the maximum value of the grain storage weight is reduced, and the operation efficiency decreases.

Here, according to the above configuration, the determination unit determines that the turning precision of the combine has decreased if the storage weight of the grain in the grain tank is greater than or equal to the predetermined weight, and furthermore the number of retries performed on one turning path is greater than or equal to the predetermined first value.

Accordingly, it is possible to avoid the case where it is determined that the turning precision of the combine has decreased when the number of retries on one turning path is relatively low and there is no need to reduce the maximum value of the grain storage weight. Therefore, according to this configuration, the operation efficiency of the combine is likely to be ensured.

Also, in the present invention, it is preferable that
  the acquisition unit is configured to acquire a second retry count that indicates a cumulative number of retries in turning operations performed by the combine, and
  the determination unit determines that the turning precision of the combine has decreased if the storage weight of the grain in the grain tank is greater than or equal to a predetermined weight, and furthermore the second retry count has reached a predetermined second value.

Even if the number of retries in one turning path is relatively low, there are cases where retries are made relatively frequently in harvesting work in the field. In this case, there is a possibility of being able to ensure the turning precision of the combine by reducing the maximum value of the grain storage weight.

Here, a configuration is conceivable in which it is determined that the turning precision of the combine has decreased if the number of retries in one turning path is greater than or equal to a predetermined threshold value, for example. However, with this configuration, it is possible to envision a situation in which, regardless of the fact that retries have been performed relatively frequently in the harvesting work in the field, it is not determined that the turning precision of the combine has decreased, and the maximum value of the grain storage weight is not reduced.

Here, according to the above configuration, the determination unit determines that the turning precision of the combine has decreased if the storage weight of the grain in the grain tank is greater than or equal to the predetermined weight, and furthermore the number of retries in the harvesting work in the field is greater than or equal to the predetermined second value.

Accordingly, it is possible to avoid a situation in which it is not determined that the turning precision of the combine has decreased, even though retries have been performed relatively frequently in the harvesting work in the field. In other words, if retries have been performed relatively frequently in the harvesting work in the field, the maximum value of the grain storage weight is reliably reduced. Therefore, according to this configuration, the turning precision of the combine is likely to be ensured.

Also, in the present invention, it is preferable that
the acquisition unit is configured to acquire a retry turn count that indicates the number of turning operations in which a retry was performed among turning operations performed by the combine, and
the determination unit determines that the turning precision of the combine has decreased if the storage weight of the grain in the grain tank is greater than or equal to a predetermined weight, and furthermore the retry turn count has reached a predetermined third value.

If the combine turns through manual operation by a worker, the number of retries in one turning path and the cumulative number of retries are dependent on the operation skill of the worker. In other words, if the operation skill of the worker is relatively high, the number of retries in one turning path and the cumulative number of retries tend to be low. If the operation skill of the worker is relatively low, the number of retries in one turning path and the cumulative number of retries tend to be high.

Accordingly, with a configuration in which the turning precision of the combine is determined based on the number of retries in one turning path or the cumulative number of retries, it is possible to envision a situation in which, even though there is no need to reduce the maximum value of the grain storage weight, it is determined that the turning precision of the combine has decreased due to the relatively low operational skill of the worker.

Accordingly, regardless of the fact there is no need to reduce the maximum value of the grain storage weight, it is determined that the turning precision of the combine has decreased, the maximum value of the grain storage weight is reduced, and the operation efficiency decreases.

Here, according to the above configuration, the determination unit determines that the turning precision of the combine has decreased if the storage weight of the grain in the grain tank is greater than or equal to the predetermined weight, and furthermore the number of turning operations that included a retry in the harvesting work in the field is greater than or equal to the predetermined third value.

Compared with the number of retries in one turning path and the cumulative number of retries, the number of turning operations that include a retry is less likely to change according to the operational skill of the worker. Therefore, according to the above configuration, it is possible to avoid a situation in which, even though there is no need to reduce the maximum value of the grain storage weight, it is determined that the turning precision of the combine has decreased due to the relatively low operational skill of the worker. In other words, according to this configuration, the operation efficiency of the combine is likely to be ensured.

Also, in the present invention, it is preferable that
the acquisition unit is configured to acquire a target turning radius of the combine and an actual turning radius of the combine, and
the determination unit determines that the turning precision of the combine has decreased if the storage weight of the grain in the grain tank is greater than or equal to a predetermined weight, and furthermore a difference between the target turning radius and the actual turning radius is greater than or equal to a predetermined value.

According to this configuration, focusing on the so-called slip amount makes it possible to accurately find the degree of overload in the grain tank. It is therefore possible to accurately determine that the turning precision of the combine has decreased.

Also, in the present invention, it is preferable that
if the determination unit determines that the turning precision of the combine has decreased, the maximum value reducing unit changes the maximum value to the storage weight of the grain in the grain tank that was detected when the determination unit determined that the turning precision of the combine has decreased.

If the maximum value reducing unit reduces the maximum value by a relatively large amount, the grain will need to be frequently discharged from the grain tank after the maximum value is reduced. The efficiency in harvesting work performed by the combine therefore decreases.

Also, if the maximum value reducing unit reduces the maximum value by a relatively small amount, after the maximum value has been reduced, the turning precision of the combine tends to decrease even if the grain storage weight is less than or equal to the maximum value. In other words, it tends to not be possible to prevent a reduction in the turning precision of the combine even though the maximum value has been reduced.

Here, according to the above configuration, when the maximum value reducing unit reduces the maximum value of the grain storage weight, the maximum value is changed to the grain storage weight that was detected at the time when it was determined that the turning precision combine has decreased. Accordingly, a decrease in the turning precision is likely to be reliably prevented, while also suppressing the case where the harvesting operation efficiency decreases due to reducing the maximum value.

Also, in the present invention, it is preferable that the combine control system further includes:
a discharge control unit configured to cause a grain discharge operation to start if the determination unit determines that the turning precision of the combine has decreased.

If the turning precision of the combine has decreased during harvesting work in the field, there is a possibility that the turning precision of the combine decreased due to the fact that the grain storage weight is high.

Here, according to the above configuration, the grain is discharged if the turning precision of the combine has decreased. Accordingly, the turning precision of the combine can be improved if the reason for the decrease in turning precision is the high grain storage weight.

Another feature of the present invention is a combine control program for controlling a combine having a grain tank that stores a grain, the combine control program causing a computer to execute:
- a detection function of detecting that a storage weight of the grain in the grain tank has reached a maximum value;
- an acquisition function of acquiring turning precision information that indicates a turning precision of the combine;
- a determination function of determining whether or not the turning precision of the combine has decreased, based on the turning precision information acquired by the acquisition function; and
- a maximum value reducing function of reducing the maximum value if the determination function determines that the turning precision of the combine has decreased.

Another feature of the present invention is a recording medium having recorded thereon a combine control program for controlling a combine having a grain tank that stores a grain, the combine control program causing a computer to execute:
- a detection function of detecting that a storage weight of the grain in the grain tank has reached a maximum value;
- an acquisition function of acquiring turning precision information that indicates a turning precision of the combine;
- a determination function of determining whether or not the turning precision of the combine has decreased, based on the turning precision information acquired by the acquisition function; and
- a maximum value reducing function of reducing the maximum value if the determination function determines that the turning precision of the combine has decreased.

Another feature of the present invention is a combine control method for controlling a combine having a grain tank that stores a grain, the combine control method including:
- a detection step of detecting that a storage weight of the grain in the grain tank has reached a maximum value;
- an acquisition step of acquiring turning precision information that indicates a turning precision of the combine;
- a determination step of determining whether or not the turning precision of the combine has decreased, based on the turning precision information acquired in the acquisition step; and
- a maximum value reducing step of reducing the maximum value if it is determined in the determination step that the turning precision of the combine has decreased.

BEST MODE FOR CARRYING OUT THE INVENTION

First Embodiment

Figure 1:
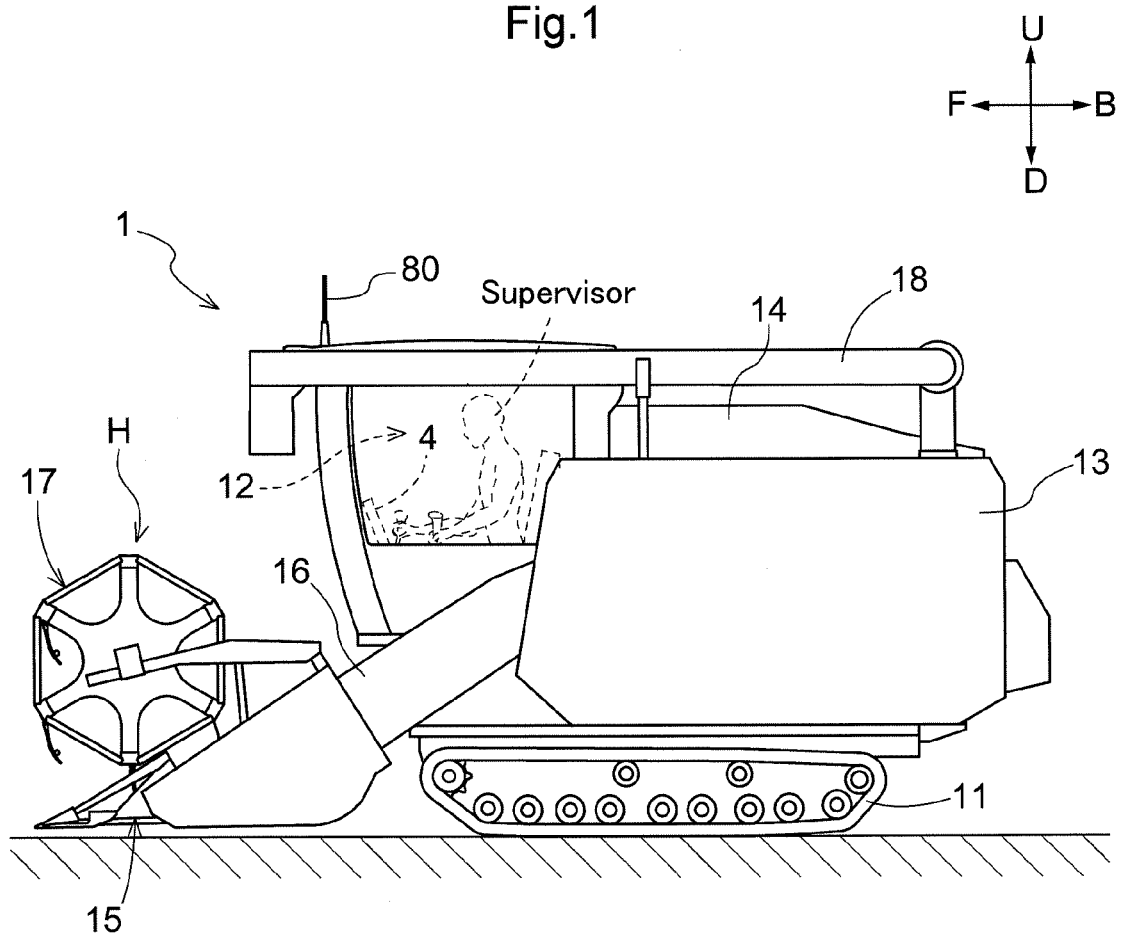
FIG. 1 is a left side view of a combine according to a first embodiment (the same follows up to FIG. 6).
Figure 3:
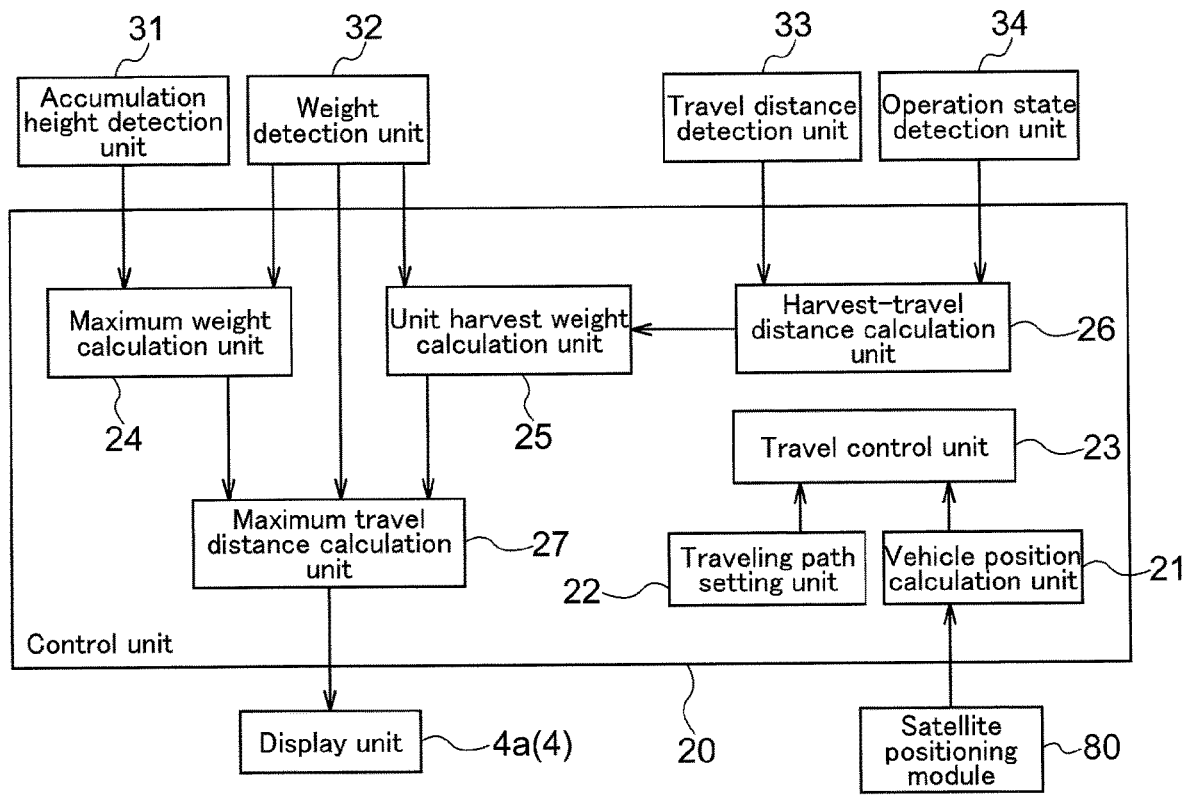
FIG. 3 is a block diagram showing a configuration related to a control unit.
Figure 4:
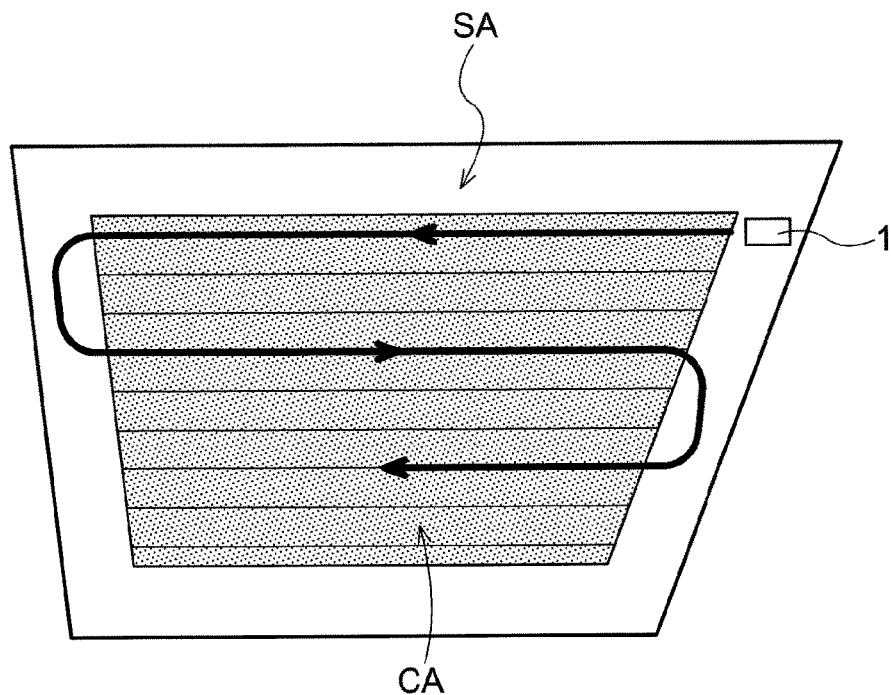
FIG. 4 is a diagram showing a traveling path in autonomous traveling.
Figure 5:
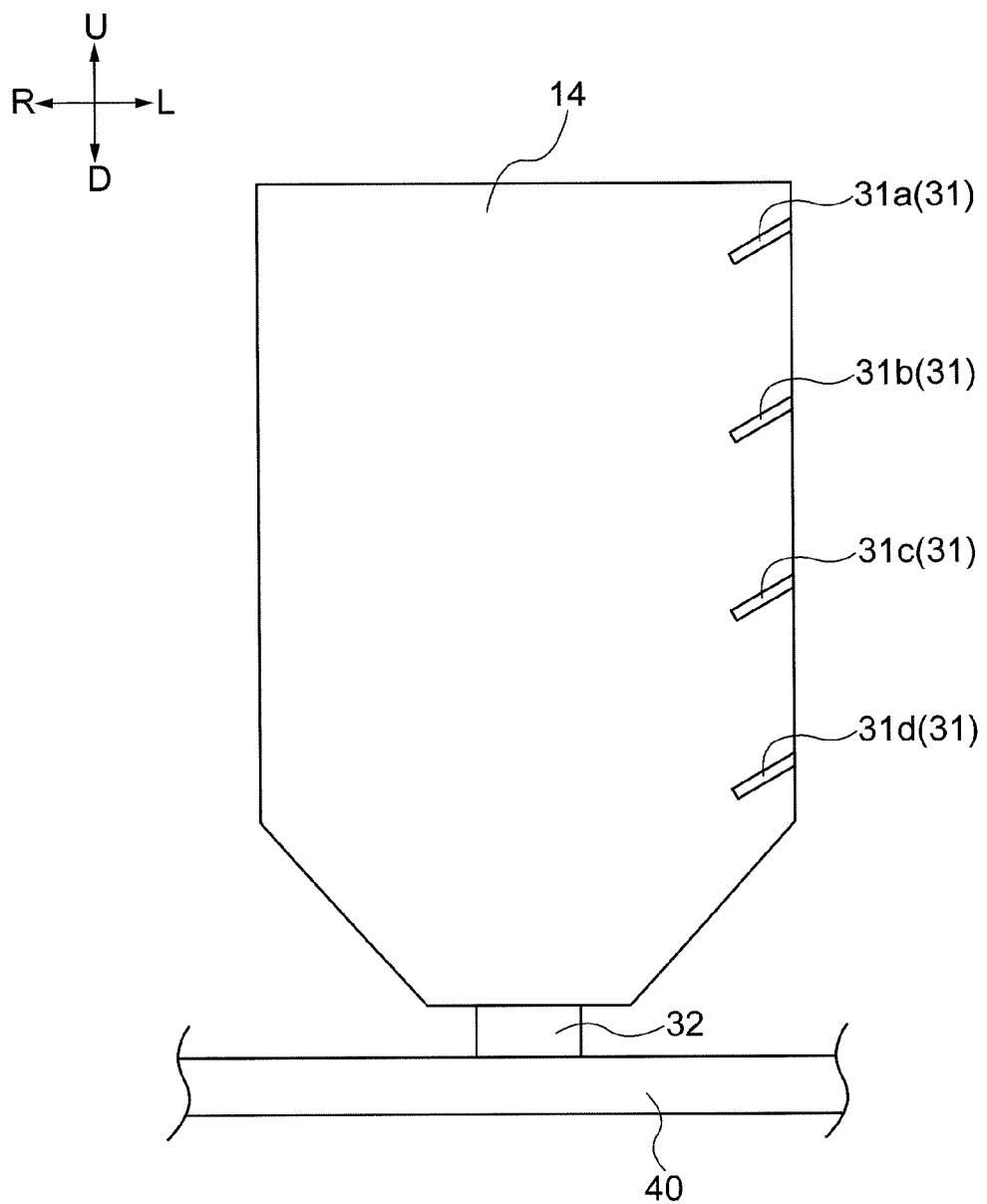
FIG. 5 is a diagram showing a configuration of an accumulation height detection unit and a weight detection unit.

The following describes a first embodiment with reference to FIGS. 1 to 6. Note that in direction-related descriptions, the directions indicated by an arrow F and an arrow B in FIG. 1 are "front" and "back" respectively, and the directions indicated by an arrow L and an arrow R in FIG. 5 are "left" and "right" respectively. Also, the directions indicated by an arrow U and an arrow D in FIGS. 1 and 5 are "up" and "down".

Overall Configuration of Combine

Figure 2:
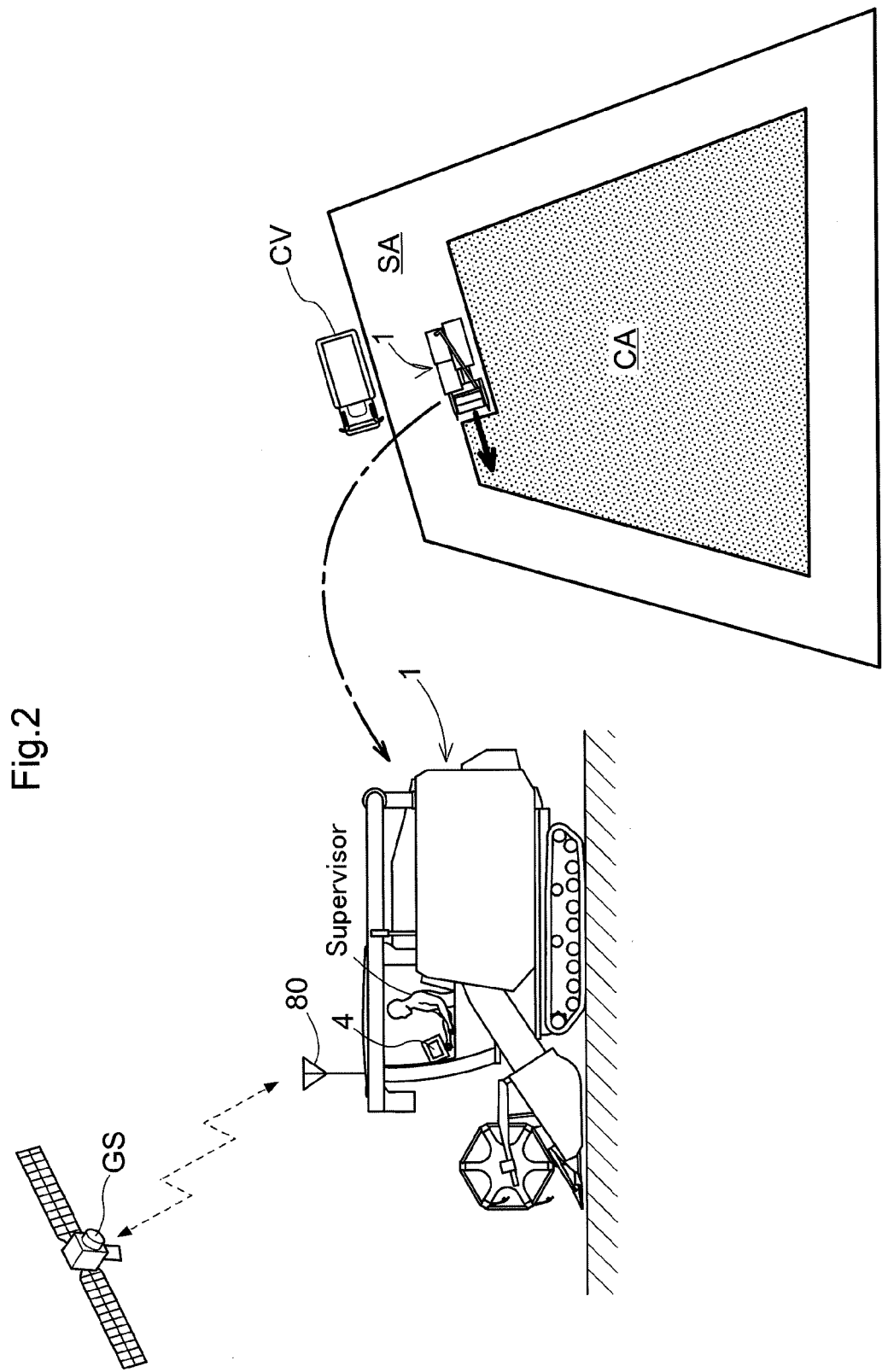
FIG. 2 is a diagram showing an overview of autonomous traveling of the combine.

As shown in FIGS. 1 and 2, a normal-type combine 1 (corresponding to a "harvester" of the present invention) includes a crawler-type traveling device 11, a driver portion 12, a threshing device 13, a grain tank 14 (corresponding to a "crop tank" of the present invention), a harvesting device H, a conveying device 16, a grain discharge device 18, and a satellite positioning module 80.

As shown in FIG. 1, the traveling device 11 is provided in a lower portion of the combine 1. The combine 1 is configured to be capable of traveling autonomously with use of the traveling device 11.

Also, the driver portion 12, the threshing device 13, and the grain tank 14 are provided on the upper side of the traveling device 11. A supervisor who supervises the operation of the combine 1 can board the driver portion 12. Note that the supervisor may supervise the operation of the combine 1 from outside the combine 1.

The grain discharge device 18 is provided above the grain tank 14. Also, the satellite positioning module 80 is attached to the upper surface of the driver portion 12.

The harvesting device H is provided in the front portion of the combine 1. The conveying device 16 is provided rearward of the harvesting device H. Also, the harvesting device H has a reaping portion 15 and a reel 17.

The reaping portion 15 reaps a planted grain in a field. The reel 17 is driven to rotate so as to rake in the planted grain that is to be harvested. According to this configuration, the harvesting device H harvests a grain in a field (corresponding to a "crop" of the present invention). The combine 1 can perform traveling harvesting in which the grain in the field is harvested with use of the harvesting device H while traveling with use of the traveling device 11.

In this way, the combine 1 includes the traveling device 11 and the harvesting device H that harvests a grain in a field.

The reaped grain that has been reaped by the reaping portion 15 is conveyed to the threshing device 13 by the conveying device 16. The reaped grain is subjected to threshing processing in the threshing device 13. The grain obtained by the threshing processing (corresponding to a "crop" of the present invention) is stored in the grain tank 14. The grain stored in the grain tank 14 is discharged to an external unit by the grain discharge device 18 as necessary.

In this way, the combine 1 includes the grain tank 14 that stores the grain harvested by the harvesting device H.

Also, as shown in FIGS. 1 and 2, a communication terminal 4 is disposed in the driver portion 12. In the present embodiment, the communication terminal 4 is fixed to the driver portion 12. However, the present invention is not limited to this, and the communication terminal 4 may be configured so as to be detachable from the driver portion 12, or the communication terminal 4 may be located outside of the combine 1.

Configuration Related to Autonomous Traveling

As shown in FIG. 3, the combine 1 includes a control unit 20. The control unit 20 includes a vehicle position calculation unit 21, a traveling path setting unit 22, and a travel control unit 23.

Also, as shown in FIG. 2, the satellite positioning module 80 receives GPS signals from satellites GS used in GPS (Global Positioning System). As show in FIG. 3, the satellite positioning module 80 sends positioning data to the vehicle position calculation unit 21 based on the received GPS signals.

The vehicle position calculation unit 21 calculates the position coordinates of the combine 1 based on the positioning data received from the satellite positioning module 80. The calculated position coordinates of the combine 1 are sent to the travel control unit 23.

Also, the traveling path setting unit 22 sets a traveling path in a field. The set traveling path is sent to the travel control unit 23.

The travel control unit 23 controls the traveling of the combine 1 based on the position coordinates of the combine 1 received from the vehicle position calculation unit 21 and the traveling path received from the traveling path setting unit 22. More specifically, the travel control unit 23 controls the combine 1 so as to travel along the traveling path set by the traveling path setting unit 22.

According to the above configuration, the combine 1 of the present embodiment is configured to be capable of autonomous traveling in a field. The following describes a procedure in the case where harvesting work is performed in a field by the combine 1.

First, the supervisor manually operates the combine 1 so as to perform traveling harvesting in which the combine 1 travels in loops along the field boundary line in a peripheral portion inside the field, as shown in FIG. 2. The area that has thus been reaped is set as a peripheral area SA. The unreaped region remaining inward of the peripheral area SA is set as a work target area CA.

Also, at this time, the supervisor makes 2 to 3 loops with the combine 1 in order to ensure that the peripheral area SA has a sufficiently large width. Here, each time the combine 1 makes one loop, the width of the peripheral area SA increases by the operation width of the combine 1. In other words, when 2 to 3 loops have been made, the width of the peripheral area SA is approximately 2 to 3 times the operation width of the combine 1.

The peripheral area SA is used as a space for the combine 1 to turn when performing traveling harvesting in the work target area CA. The peripheral area SA is also used as a traveling space for moving to a grain discharge location or moving to a refueling location after pausing the traveling harvesting.

Note that a cargo vehicle CV show in FIG. 2 can collect and transport grain that the combine 1 has discharged from the grain discharge device 18. When grain is to be discharged, the combine 1 moves to the vicinity of the cargo vehicle CV and then discharges the grain to the cargo vehicle CV with use of the grain discharge device 18.

When the peripheral area SA and the work target area CA have been set, a traveling path is set in the work target area CA as shown in FIG. 4. This traveling path is set by the traveling path setting unit 22.

When the traveling path has been set, the travel control unit 23 controls the traveling of the combine 1 such that the combine 1 travels autonomously along the traveling path. As shown in FIGS. 1 and 2, the autonomous traveling of the combine 1 is supervised by the supervisor.

Configuration Related to Maximum Travel Distance Calculation Unit

As shown in FIGS. 3 and 5, the combine 1 includes an accumulation height detection unit 31, a weight detection unit 32, a travel distance detection unit 33, and an operation state detection unit 34. The control unit 20 includes a maximum weight calculation unit 24, a unit harvest weight calculation unit 25, a harvest-travel distance calculation unit 26, and a maximum travel distance calculation unit 27. The communication terminal 4 includes a display unit 4a that displays various types of information.

As shown in FIG. 5, the accumulation height detection unit 31 includes a first sensor 31a, a second sensor 31b, a third sensor 31c, and a fourth sensor 31d.

The first sensor 31a, the second sensor 31b, the third sensor 31c, and the fourth sensor 31d are all disposed on the inner side of a left side wall of the grain tank 14. Among the first to fourth sensors 31a, 31b, 31c, and 31d, the first sensor 31a is provided at the highest position, and the fourth sensor 31d is provided at the lowest position. The second sensor 31b and the third sensor 31c are arranged between the first sensor 31a and the fourth sensor 31d in the height direction. The second sensor 31b is provided at a higher position than the third sensor 31c.

The first sensor 31a, the second sensor 31b, the third sensor 31c, and the fourth sensor 31d are each a pressure sensor, and are configured to output an ON signal when pressure is applied by grain, and not output the ON signal when pressure is not applied by grain.

According to this configuration, the accumulation height detection unit 31 can detect the accumulation height of the grain stored in the grain tank 14. For example, if the grain accumulated in the grain tank 14 has reached a height between the third sensor 31c and the fourth sensor 31d, the fourth sensor 31d outputs the ON signal, whereas the first sensor 31a, the second sensor 31b, and the third sensor 31c do not output the ON signal. Accordingly, it is detected that the accumulation height of the grain in the grain tank 14 is greater than or equal to the height of the fourth sensor 31d and less than the height of the third sensor 31c.

In this way, the combine 1 includes the accumulation height detection unit 31 that detects the accumulation height of the grain stored in the grain tank 14.

As shown in FIG. 3, the accumulation height detected by the accumulation height detection unit 31 is sent to the maximum weight calculation unit 24.

Also, as shown in FIG. 5, the weight detection unit 32 is disposed so as to be sandwiched between the grain tank 14 and the body frame 40. Based on the weight of the grain tank 14, the weight detection unit 32 detects the grain weight over time, that is to say the weight of the grain stored in the grain tank 14. In the present embodiment, the weight detection unit 32 is constituted by a load cell.

Note that the weight of the grain tank 14 and the grain weight are both values that indicate the weight of the grain stored in the grain tank 14. The weight of the grain tank 14 and the grain weight therefore both correspond to a "storage weight" of the present invention.

In the present embodiment, the weight detection unit 32 is configured to detect the grain weight as the "storage weight" of the present invention. However, the present invention is not limited to this, and the value detected by the weight detection unit 32 may be a value other than the grain weight, as long as it is a value that indicates the weight of the grain stored in the grain tank 14. For example, the weight detection unit 32 may be configured to detect the weight of the grain tank 14 as the "storage weight" of the present invention.

In this way, the combine 1 includes the weight detection unit 32 that detects the grain weight, which is a value that indicates the weight of the grain stored in the grain tank 14.

As shown in FIG. 3, the grain weight detected over time by the weight detection unit 32 is sent to the maximum weight calculation unit 24, the unit harvest weight calculation unit 25, and the maximum travel distance calculation unit 27.

The maximum weight calculation unit 24 calculates a maximum weight, which is a value that indicates the grain weight at the maximum storage amount of the grain tank 14. More specifically, the maximum weight calculation unit 24 calculates the maximum weight based on the grain weight received from the weight detection unit 32 and the grain accumulation height received from the accumulation height detection unit 31. At this time, the maximum weight calculation unit 24 calculates the maximum weight by dividing the grain weight by the ratio of the detected accumulation height to the maximum value of the accumulation height. Note that the maximum value of the accumulation height is the grain accumulation height in the state where the grain amount has reached the maximum storage amount in the grain tank 14.

For example, if the detected grain weight is 1000 kilograms, and the ratio of the detected accumulation height to the maximum value of the accumulation height is 0.5, the maximum weight calculation unit 24 divides 1000 kilograms by 0.5, thus obtaining the maximum weight of 2000 kilograms.

More specifically, when the maximum weight is calculated, the accumulation height detection unit 31 detects the grain accumulation height based on ON signals output by the first sensor 31a, the second sensor 31b, the third sensor 31c, and the fourth sensor 31d, as described above. For this reason, the accumulation height detection result is the most precise at the instant when the grain in the grain tank 14 has reached the height of the first sensor 31a, second sensor 31b, the third sensor 31c, or the fourth sensor 31d.

Given this, in the present embodiment, the maximum weight is calculated based on the accumulation height that was detected at the instant when the grain in the grain tank 14 reached the height of the first sensor 31a, the second sensor 31b, the third sensor 31c, or the fourth sensor 31d, and also the grain weight that was detected at that time. The maximum weight can therefore be calculated with high precision.

The maximum weight calculated by the maximum weight calculation unit 24 is sent to the maximum travel distance calculation unit 27.

In this way, the combine 1 includes the maximum weight calculation unit 24 that calculates the maximum weight, which is a value that indicates the grain weight at the maximum storage amount of the grain tank 14. Also, the maximum weight calculation unit 24 calculates the maximum weight based on the grain weight detected by the weight detection unit 32 and the accumulation height detected by the accumulation height detection unit 31.

The travel distance detection unit 33 detects the travel distance of the combine 1 over time. The travel distance detected by the travel distance detection unit 33 is sent to the harvest-travel distance calculation unit 26.

The operation state detection unit 34 detects, over time, whether or not the combine 1 is in a state of harvesting grain in a field with use of the harvesting device H. The detection result obtained by the operation state detection unit 34 is sent to the harvest-travel distance calculation unit 26.

The harvest-travel distance calculation unit 26 calculates, over time, a harvest-travel distance based on the travel distance detected by the travel distance detection unit 33 and the detection result obtained by the operation state detection unit 34. The harvest-travel distance is the distance traveled during traveling harvesting.

More specifically, the harvest-travel distance calculation unit 26 calculates the harvest-travel distance by extracting, from the travel distance of the combine 1, only the portions in the state where the combine 1 is harvesting grain in the field with use of the harvesting device H.

The harvest-travel distance calculated over time by the harvest-travel distance calculation unit 26 is sent to the unit harvest weight calculation unit 25.

The unit harvest weight calculation unit 25 calculates a unit harvest weight based on the grain weight detected by the weight detection unit 32 and the harvest-travel distance calculated by the harvest-travel distance calculation unit 26. The unit harvest weight is the weight of grain harvested per unit of harvest-travel distance.

More specifically, the unit harvest weight calculation unit 25 calculates the unit harvest weight by dividing the amount of increase in the grain weight in a predetermined time period by the harvest-travel distance corresponding to that time period.

The unit harvest weight calculated by the unit harvest weight calculation unit 25 is sent to the maximum travel distance calculation unit 27.

In this way, the combine 1 includes the unit harvest weight calculation unit 25 that calculates the unit harvest weight, which is the weight of grain harvested per unit of harvest-travel distance.

The maximum travel distance calculation unit 27 calculates a maximum travel distance based on the grain weight detected by the weight detection unit 32, the maximum weight calculated based on the maximum weight calculation unit 24, and the unit harvest weight calculated based on the unit harvest weight calculation unit 25. The maximum travel distance is the maximum distance that the combine 1 can travel during traveling harvesting before the amount of grain stored in the grain tank 14 reaches the maximum storage amount.

More specifically, the maximum travel distance calculation unit 27 calculates the maximum travel distance by dividing the difference between the maximum weight and the grain weight at the current time by the unit harvest weight.

The maximum travel distance calculated by the maximum travel distance calculation unit 27 is sent to the communication terminal 4. The communication terminal 4 displays the maximum travel distance received from the maximum travel distance calculation unit 27 on the display unit 4a.

In this way, the combine 1 includes the maximum travel distance calculation unit 27 that calculates the maximum travel distance, which is the maximum distance that can be traveled during traveling harvesting before the amount of grain stored in the grain tank 14 reaches the maximum storage amount, based on the grain weight detected by the weight detection unit 32, the maximum weight calculated by the maximum weight calculation unit 24, and the unit harvest weight calculated by the unit harvest weight calculation unit 25.

According to the configuration described above, the grain weight, which is a value that indicates the weight of grain stored in the grain tank 14, is detected by the weight detection unit 32. Also, the maximum weight, which is a value that indicates the grain weight at the maximum storage amount of the grain tank 14, is calculated by the maximum weight calculation unit 24. Furthermore, the unit harvest weight, which is the weight of grain harvested per unit of harvest-travel distance, is calculated by the unit harvest weight calculation unit 25.

Then, by dividing the difference between the maximum weight and the grain weight at the current time by the unit harvest weight, it is possible to calculate the maximum travel distance, which is the maximum distance that can be traveled during traveling harvesting before the amount of grain stored in the grain tank 14 reaches the maximum storage amount.

In other words, according to the configuration described above, it is possible to calculate the maximum distance that can be traveled during traveling harvesting before the amount of grain stored in the grain tank 14 reaches the maximum storage amount.

Variations of First Embodiment

The following describes variations in which changes have been made to the embodiment described above. The matter other than that described in the following variations is similar to the matter described in the above embodiment. The above embodiment and following variations may be appropriately combined as long as no contradiction arises. Note that the scope of the present invention is not intended to be limited to the above embodiment and following variations.

First Variation

In the above embodiment, the maximum weight calculation unit 24 calculates the maximum weight based on the grain weight received from the weight detection unit 32 and the grain accumulation height received from the accumulation height detection unit 31.

However, the present invention is not limited to this. The following description of a first variation of the first embodiment focuses on points of difference from the above embodiment. The configurations of portions other than those described below are similar to the corresponding configurations of the above embodiment. Also, configurations similar to those of the above embodiment are denoted by the same reference signs.

Figure 6:
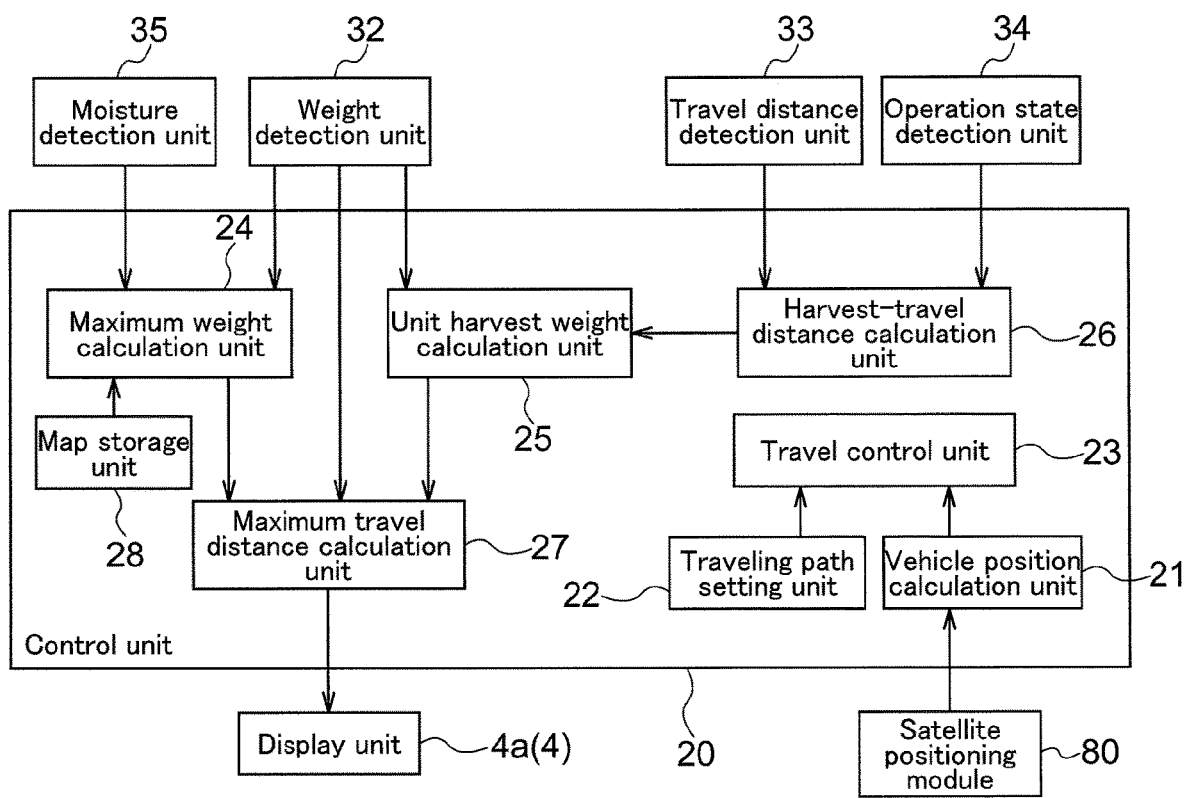
FIG. 6 is a block diagram showing a configuration related to a control unit according to a first variation.

FIG. 6 is a block diagram showing a configuration related to the control unit 20 in a first variation of the first embodiment. As shown in FIG. 6, the combine 1 in the first variation includes a moisture detection unit 35 and a map storage unit 28.

The moisture detection unit 35 is configured to detect the moisture content of the grain harvested by the harvesting device H. The moisture content detected by the moisture detection unit 35 is sent to the maximum weight calculation unit 24.

In this way, the combine 1 includes the moisture detection unit 35 that detects the moisture content of the grain harvested by the harvesting device H.

Also, the map storage unit 28 stores a map that indicates a relationship between the weight of grain at the maximum storage amount and the moisture content of grain. Note that the weight of grain at the maximum storage amount changes depending on the moisture content of the grain. The relationship between the weight of grain at the maximum storage amount and the moisture content of the grain can be found through experimentation.

The maximum weight calculation unit 24 acquires, from the map storage unit 28, the map that indicates the relationship between the weight of grain at the maximum storage amount and the moisture content of grain. The maximum weight calculation unit 24 then calculates the maximum weight based on the map acquired from the map storage unit 28 and the moisture content detected by the moisture detection unit 35. The maximum weight calculated by the maximum weight calculation unit 24 is sent to the maximum travel distance calculation unit 27.

In this way, the maximum weight calculation unit 24 calculates the maximum weight based on the moisture content detected by the moisture detection unit 35.

Other Variations (1) The traveling device 11 may be a wheel type, or may be a semi-crawler type.

(2) As described in the above embodiment, the grain corresponds to the "crop" of the present invention. However, the present invention is not limited to this, and the "crop" may be something other than a grain. Other examples that correspond to the "crop" of the present invention include corn, potatoes, carrots, and sugar cane.

(3) The moisture detection unit 35 may be omitted.

(4) The map storage unit 28 may be omitted.

(5) The accumulation height detection unit 31 may be omitted.

(6) The vehicle position calculation unit 21, the traveling path setting unit 22, and/or the travel control unit 23 may be omitted. In other words, the "harvester" of the present invention is not required to be capable of autonomous traveling.

(7) The communication terminal 4 and the display unit 4a may be omitted.

(8) In the above embodiment, the supervisor manually operates the combine 1 so as to perform traveling harvesting in which the combine 1 travels in loops along the field boundary line in a peripheral portion inside the field, as shown in FIG. 2. However, the present invention is not limited to this, and a configuration is possible in which the combine 1 travels autonomously so as to perform traveling harvesting in which the combine 1 travels in loops along the field boundary line in a peripheral portion inside the field.

(9) The traveling path set by the traveling path setting unit 22 may be a straight path, or may be a curved path.

(10) The present invention may be configured as a maximum travel distance calculation program that causes a computer to realize the functions of units in the above embodiment. The present invention may also be configured as a recording medium having stored therein a maximum travel distance calculation program that causes a computer to realize the functions of units in the above embodiment. The present invention may furthermore be configured as a maximum travel distance calculation method in which the processing of units in the above embodiment is performed through a plurality of steps.

Second Embodiment

Figure 7:
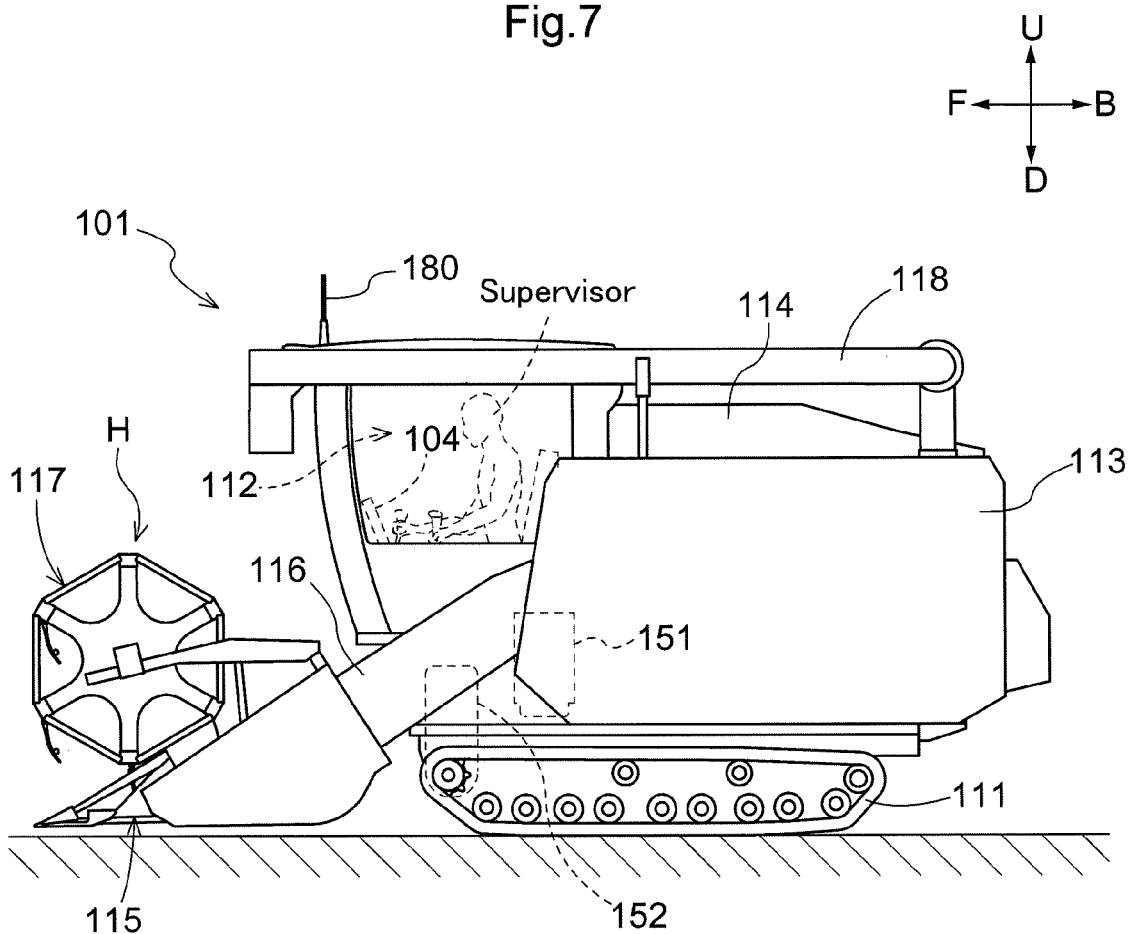
FIG. 7 is a left side view of a combine according to a second embodiment (the same follows up to FIG. 11).

The following describes a second embodiment of the present invention with reference to FIGS. 7 to 11. Note that in direction-related descriptions, the directions indicated by an arrow F and an arrow B in FIG. 7 are "front" and "back" respectively. Also, the directions indicated by an arrow U and an arrow D in FIG. 7 are "up" and "down".

Overall Configuration of Combine

Figure 8:
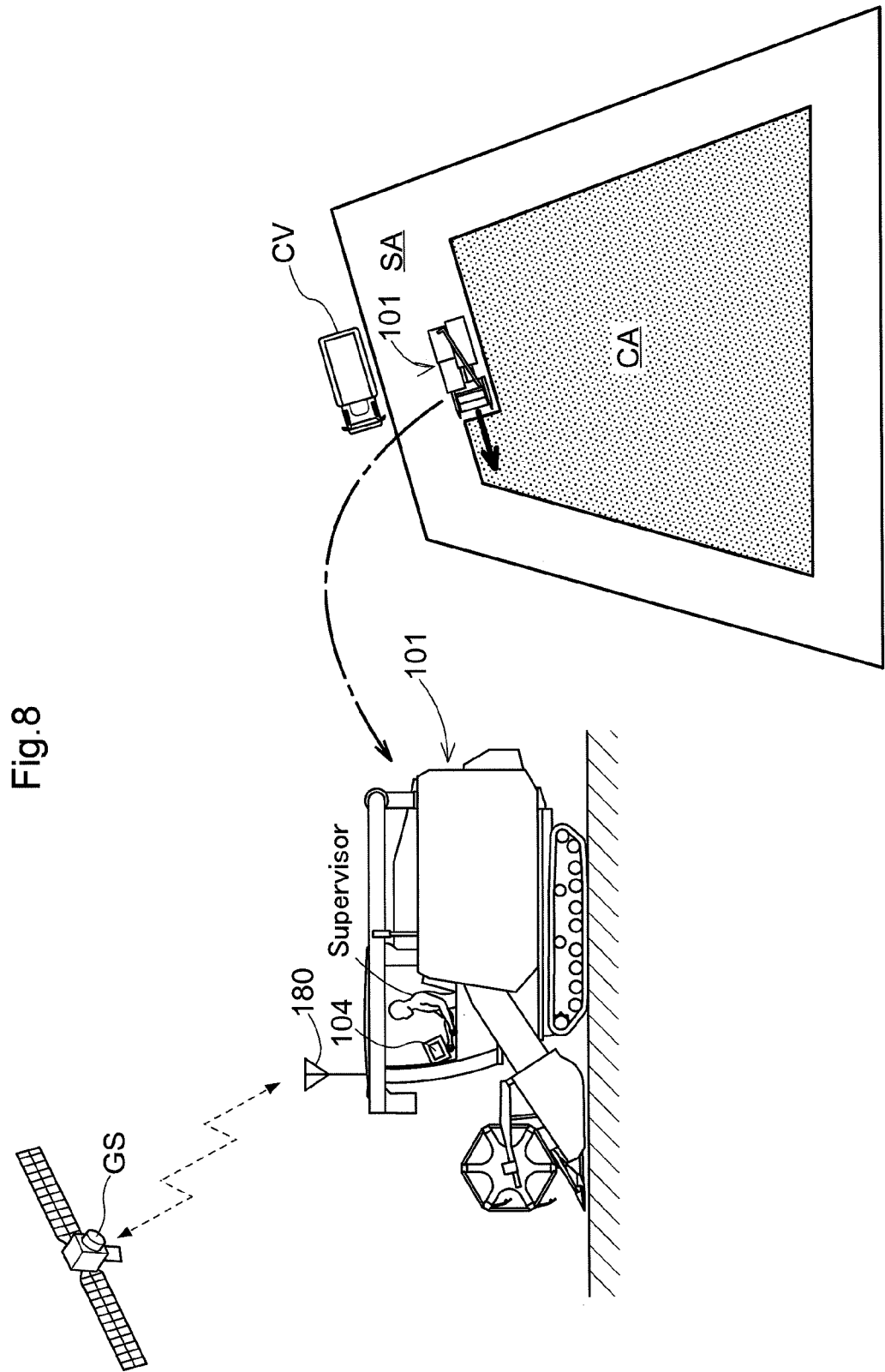
FIG. 8 is a diagram showing an overview of autonomous traveling of the combine.

As shown in FIGS. 7 and 8, a normal-type combine 101 (corresponding to an "agricultural work vehicle" of the present invention) includes a crawler-type traveling device 111, a driver portion 112, a threshing device 113, a grain tank 114, a harvesting device H, a conveying device 116, a grain discharge device 118, and a satellite positioning module 180. The combine 101 also includes an engine 151 and a transmission apparatus 152.

As shown in FIG. 7, the traveling device 111 is provided in a lower portion of the combine 101. Also, drive power of the engine 151 is subjected to gear-shifting by the transmission apparatus 152 and then transmitted to the traveling device 111. According to this configuration, the combine 101 is configured to be capable of traveling autonomously with use of the traveling device 111.

Also, the driver portion 112, the threshing device 113, and the grain tank 114 are provided on the upper side of the traveling device 111. A supervisor who supervises the operation of the combine 101 can board the driver portion 112. Note that the supervisor may supervise the operation of the combine 101 from outside the combine 101.

The grain discharge device 118 is provided above the grain tank 114. Also, the satellite positioning module 180 is attached to the upper surface of the driver portion 112.

The harvesting device H is provided in the front portion of the combine 101. The conveying device 116 is provided rearward of the harvesting device H. Also, the harvesting device H has a reaping portion 115 and a reel 117.

The reaping portion 115 reaps a planted grain in a field. The reel 117 is driven to rotate so as to rake in the planted grain that is to be harvested. According to this configuration, the harvesting device H harvests a grain in a field. The combine 101 can perform traveling harvesting in which the grain in the field is harvested with use of the harvesting device H while traveling with use of the traveling device 111.

The reaped grain that has been reaped by the reaping portion 115 is conveyed to the threshing device 113 by the conveying device 116. The reaped grain is subjected to threshing processing in the threshing device 113. The grain obtained by the threshing processing is stored in the grain tank 114. The grain stored in the grain tank 114 is discharged to an external unit by the grain discharge device 118 as necessary.

Also, as shown in FIGS. 7 and 8, a communication terminal 104 is disposed in the driver portion 112. In the present embodiment, the communication terminal 104 is fixed to the driver portion 112. However, the present invention is not limited to this, and the communication terminal 104 may be configured so as to be detachable from the driver portion 112, or the communication terminal 104 may be located outside of the combine 101.

Configuration Related to Autonomous Traveling

Figure 9:
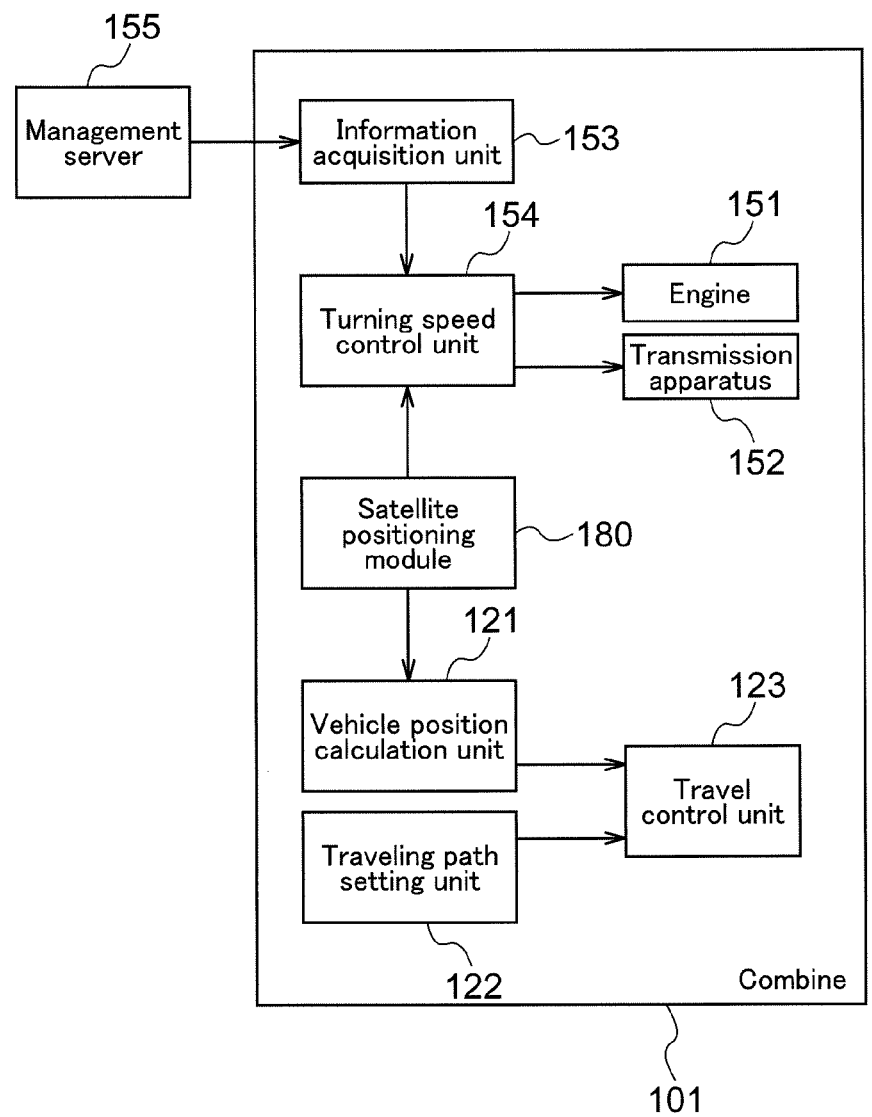
FIG. 9 is a block diagram showing a configuration related to an information acquisition unit and a turning speed control unit.

As shown in FIG. 9, the combine 101 includes a vehicle position calculation unit 121, a traveling path setting unit 122, and a travel control unit 123.

Also, as shown in FIG. 8, the satellite positioning module 180 receives GPS signals from satellites GS used in GPS (Global Positioning System). As show in FIG. 9, the satellite positioning module 180 sends positioning data to the vehicle position calculation unit 121 based on the received GPS signals.

The vehicle position calculation unit 121 calculates the position coordinates of the combine 101 based on the positioning data received from the satellite positioning module 180. The calculated position coordinates of the combine 101 are sent to the travel control unit 123.

Also, the traveling path setting unit 122 sets a traveling path in a field. The set traveling path is sent to the travel control unit 123.

The travel control unit 123 controls the traveling of the combine 101 based on the position coordinates of the combine 101 received from the vehicle position calculation unit 121 and the traveling path received from the traveling path setting unit 122. More specifically, the travel control unit 123 controls the combine 101 so as to travel along the traveling path set by the traveling path setting unit 122.

According to the above configuration, the combine 101 of the present embodiment is configured to be capable of autonomous traveling in a field. The following describes a procedure in the case where harvesting work is performed in a field by the combine 101.

First, the supervisor manually operates the combine 101 so as to perform traveling harvesting in which the combine 101 travels in loops along the field boundary line in a peripheral portion inside the field, as shown in FIG. 8. The area that has thus been reaped is set as a peripheral area SA. The unreaped region remaining inward of the peripheral area SA is set as a work target area CA.

Also, at this time, the supervisor makes 2 to 3 loops with the combine 101 in order to ensure that the peripheral area SA has a sufficiently large width. Here, each time the combine 101 makes one loop, the width of the peripheral area SA increases by the operation width of the combine 101. In other words, when 2 to 3 loops have been made, the width of the peripheral area SA is approximately 2 to 3 times the operation width of the combine 101.

The peripheral area SA is used as a space for the combine 101 to turn when performing traveling harvesting in the work target area CA. The peripheral area SA is also used as a traveling space for moving to a grain discharge location or moving to a refueling location after pausing the traveling harvesting.

Note that a cargo vehicle CV show in FIG. 8 can collect and transport grain that the combine 101 has discharged from the grain discharge device 118. When grain is to be discharged, the combine 101 moves to the vicinity of the cargo vehicle CV and then discharges the grain to the cargo vehicle CV with use of the grain discharge device 118.

Figure 10:
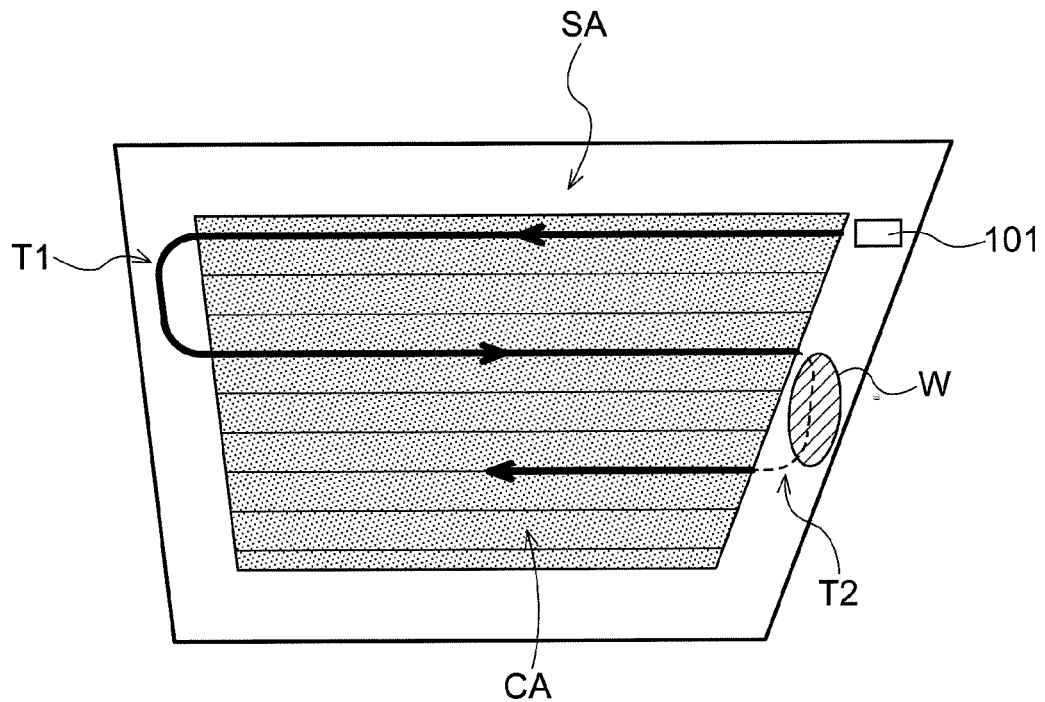
FIG. 10 is a diagram showing traveling of the combine in a field that is not a ridged field.
Figure 11:
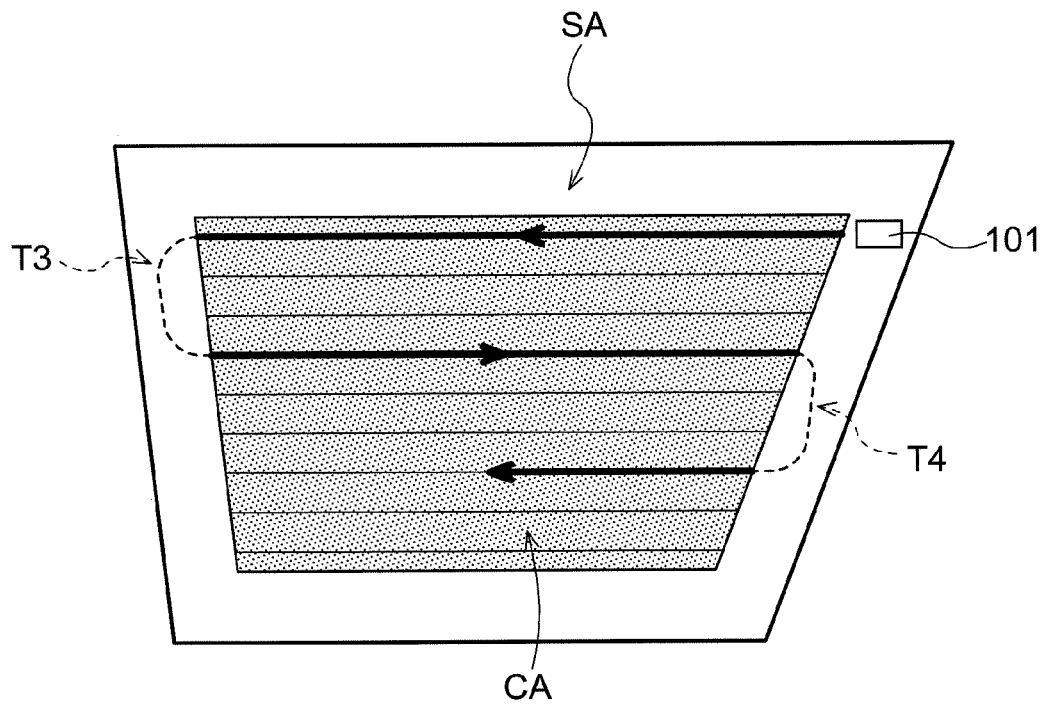
FIG. 11 is a diagram showing traveling of the combine in a ridged field.

When the peripheral area SA and the work target area CA have been set, a traveling path is set in the work target area CA as shown in FIGS. 10 and 11. This traveling path is set by the traveling path setting unit 122.

When the traveling path has been set, the travel control unit 123 controls the traveling of the combine 101 such that the combine 101 travels autonomously along the traveling path. As shown in FIGS. 7 and 8, the autonomous traveling of the combine 101 is supervised by the supervisor.

Configurations Related to Information Acquisition Unit and Turning Speed Control Unit As shown in FIG. 9, the combine 101 includes an information acquisition unit 153 and a turning speed control unit 154. The information acquisition unit 153 is configured to be capable of communicating with a management server 155 that manages the combine 101.

The management server 155 stores field surface information regarding the field in which the combine 101 performs harvesting work. The field surface information is information that indicates characteristics of the field surface. The field surface information also includes information that indicates a wet location tendency at various positions in the field. The field surface information further includes information that indicates whether or not the field is a ridged field.

Note that in the present embodiment, the field surface information is generated based on data input by the supervisor and is stored in the management server 155 before harvesting work is performed.

The information acquisition unit 153 acquires the field surface information from the management server 155. The acquired field surface information is sent to the turning speed control unit 154.

In this way, the combine 101 includes the information acquisition unit 153 that acquires the field surface information, which is information that indicates characteristics of the field surface.

As show in FIG. 9, the satellite positioning module 180 sends positioning data to the turning speed control unit 154 based on received GPS signals. The turning speed control unit 154 controls the engine 151 and the transmission apparatus 152 based on the field surface information received from the information acquisition unit 153 and the positioning data received from the satellite positioning module 180.

The control of the turning speed of the combine 101 by the turning speed control unit 154 is described below with reference to FIGS. 10 and 11.

Case of Traveling Turn at a Position Having a High Wet Location Tendency

FIG. 10 is a diagram showing traveling of the combine 101 in a field that is not a ridged field. In FIG. 10, the traveling of the combine 101 is indicated by arrows. Also, in FIG. 10, the combine 101 makes two traveling turns, namely a first traveling turn T1 and a second traveling turn T2.

The field shown in FIG. 10 includes a wet location W. The wet location W has a relatively high wet location tendency. Also, the portions other than the wet location W in the field have a relatively low wet location tendency. The first traveling turn T1 is a traveling turn that is made in a portion other than the wet location W. The second traveling turn T2 is a traveling turn that is made in the wet location W.

The turning speed control unit 154 controls the engine 151 and the transmission apparatus 152 such that the turning speed is lower in the case where the combine 101 makes a traveling turn at a location where the wet location tendency is relatively high, than in the case where the combine 101 makes a traveling turn at a location where the wet location tendency is relatively low.

More specifically, the turning speed control unit 154 sets the rotation speed of the engine 151 lower in the case where the combine 101 makes a traveling turn at a location where the wet location tendency is relatively high, than in the case where the combine 101 makes a traveling turn at a location where the wet location tendency is relatively low.

Also, the turning speed control unit 154 controls the transmission apparatus 152 such that the reduction ratio is higher in the case where the combine 101 makes a traveling turn at a location where the wet location tendency is relatively high, than in the case where the combine 101 makes a traveling turn at a location where the wet location tendency is relatively low.

Specifically, in the traveling of the combine 101 shown in FIG. 10, the rotation speed of the engine 151 during the second traveling turn T2 is lower than the rotation speed of the engine 151 during the first traveling turn T1. Also, the reduction ratio of the transmission apparatus 152 during the second traveling turn T2 is higher than the reduction ratio of the transmission apparatus 152 during the first traveling turn T1.

Accordingly, the turning speed during the second traveling turn T2 is lower than the turning speed during the first traveling turn T1. Note that in FIG. 10, the dashed lines indicate that the turning speed is relatively low during the second traveling turn T2.

In this way, the turning speed control unit 154 sets a lower turning speed in the case of making a traveling turn at a location having a relatively high wet location tendency than in the case of making a traveling turn at a location having a relatively low wet location tendency.

Case of Making a Traveling Turn in a Ridged Field

FIG. 11 is a diagram showing traveling of the combine 101 in a field that is a ridged field. In FIG. 11, the traveling of the combine 101 is indicated by arrows. Also, in FIG. 11, the combine 101 makes two traveling turns, namely a third traveling turn T3 and a fourth traveling turn T4.

The turning speed control unit 154 controls the engine 151 and the transmission apparatus 152 such that the turning speed is lower in the case where the combine 101 travels in a ridged field than in the case where the combine 101 travels in a field that is not a ridged field.

More specifically, the turning speed control unit 154 sets the rotation speed of the engine 151 lower in the case where the combine 101 travels in a ridged field than in the case where the combine 101 travels in a field that is not a ridged field.

Also, the turning speed control unit 154 controls the transmission apparatus 152 such that the reduction ratio is higher in the case where the combine 101 travels in a ridged field than in the case where the combine 101 travels in a field that is not a ridged field.

Specifically, in the traveling of the combine 101 shown in FIG. 11, the rotation speed of the engine 151 during the third traveling turn T3 and the fourth traveling turn T4 is lower than the rotation speed of the engine 151 during the first traveling turn T1 shown in FIG. 10. Also, the reduction ratio of the transmission apparatus 152 during the third traveling turn T3 and the fourth traveling turn T4 is higher than the reduction ratio of the transmission apparatus 152 during the first traveling turn T1 shown in FIG. 10.

Accordingly, the turning speed during the third traveling turn T3 and the fourth traveling turn T4 is lower than the turning speed during the first traveling turn T1. Note that in FIG. 11, the dashed lines indicate that the turning speed is relatively low during the third traveling turn T3 and the fourth traveling turn T4.

In this way, the turning speed control unit 154 sets a lower turning speed in the case of traveling in a ridged field than in the case of traveling in a field that is not a ridged field. Also, the combine 101 includes the turning speed control unit 154 that controls the turning speed based on the field surface information acquired by the information acquisition unit 153.

According to the configuration described above, it is possible to control the turning speed of the combine 101 according to characteristics of the field surface. This therefore suppresses problems that occur during turning due to characteristics of the field surface.

Variations of Second Embodiment

The following describes variations in which changes have been made to the embodiment described above. The matter other than that described in the following variations is similar to the matter described in the above embodiment. The above embodiment and following variations may be appropriately combined as long as no contradiction arises. Note that the scope of the present invention is not intended to be limited to the above embodiment and following variations.

(1) The traveling device 111 may be a wheel type, or may be a semi-crawler type.

(2) In the above embodiment, the field surface information is generated based on data input by the supervisor and is stored in the management server 155 before harvesting work is performed. However, the present invention is not limited to this. For example, the field surface information may be generated based on data that indicates slipping, vehicle body tilting, and the like detected by various sensors provided in the agricultural work vehicle in agricultural work performed in the field in the past.

(3) In the above embodiment, the information acquisition unit 153 is configured to acquire the field surface information from the management server 155. However, the present invention is not limited to this, and the information acquisition unit 153 may be configured to acquire field surface information that was generated in the combine 101. For example, a configuration is possible in which the combine 101 includes a camera, images of the field are captured by the camera when starting harvesting work in the field, field surface information is generated by performing image processing that employs artificial intelligence, and the information acquisition unit 153 acquires the generated field surface information. Also, a configuration is possible in which the combine 101 includes a soil moisture sensor, the soil moisture content of the field surface is detected by the soil moisture sensor when performing traveling harvesting in a loop in the peripheral portion in the field, and information indicating the wet location tendency at various locations in the field is generated based on the detected soil moisture content. Furthermore, a configuration is possible in which the combine 101 includes a thermographic camera, the soil moisture content of the field surface is estimated with use of the thermographic camera, and information indicating the wet location tendency at various locations in the field is generated based on the estimated soil moisture content.

(4) The turning speed control unit 154 may be configured to control only either the engine 151 or the transmission apparatus 152. Also, the turning speed control unit 154 may be configured to control a constituent element other than the engine 151 and the transmission apparatus 152 in order to control the turning speed.

(5) The field surface information is not required to include information that indicates whether or not the field is a ridged field.

(6) The field surface information is not required to include information that indicates the wet location tendency at various locations in the field.

(7) The vehicle position calculation unit 121, the traveling path setting unit 122, and/or the travel control unit 123 may be omitted. In other words, the "agricultural work vehicle" of the present invention is not required to be capable of autonomous traveling.

(8) In the above embodiment, the supervisor manually operates the combine 101 so as to perform traveling harvesting in which the combine 101 travels in loops along the field boundary line in a peripheral portion inside the field, as shown in FIG. 8. However, the present invention is not limited to this, and a configuration is possible in which the combine 101 travels autonomously so as to perform traveling harvesting in which the combine 101 travels in loops along the field boundary line in a peripheral portion inside the field.

(9) The traveling path set by the traveling path setting unit 122 may be a straight path, or may be a curved path.

(10) The present invention may be configured as a turning control program that causes a computer to realize the functions of units in the above embodiment. The present invention may also be configured as a recording medium having stored therein a turning control program that causes a computer to realize the functions of units in the above embodiment. The present invention may furthermore be configured as a turning control method in which the processing of units in the above embodiment is performed through a plurality of steps.

Third Embodiment

Figure 12:
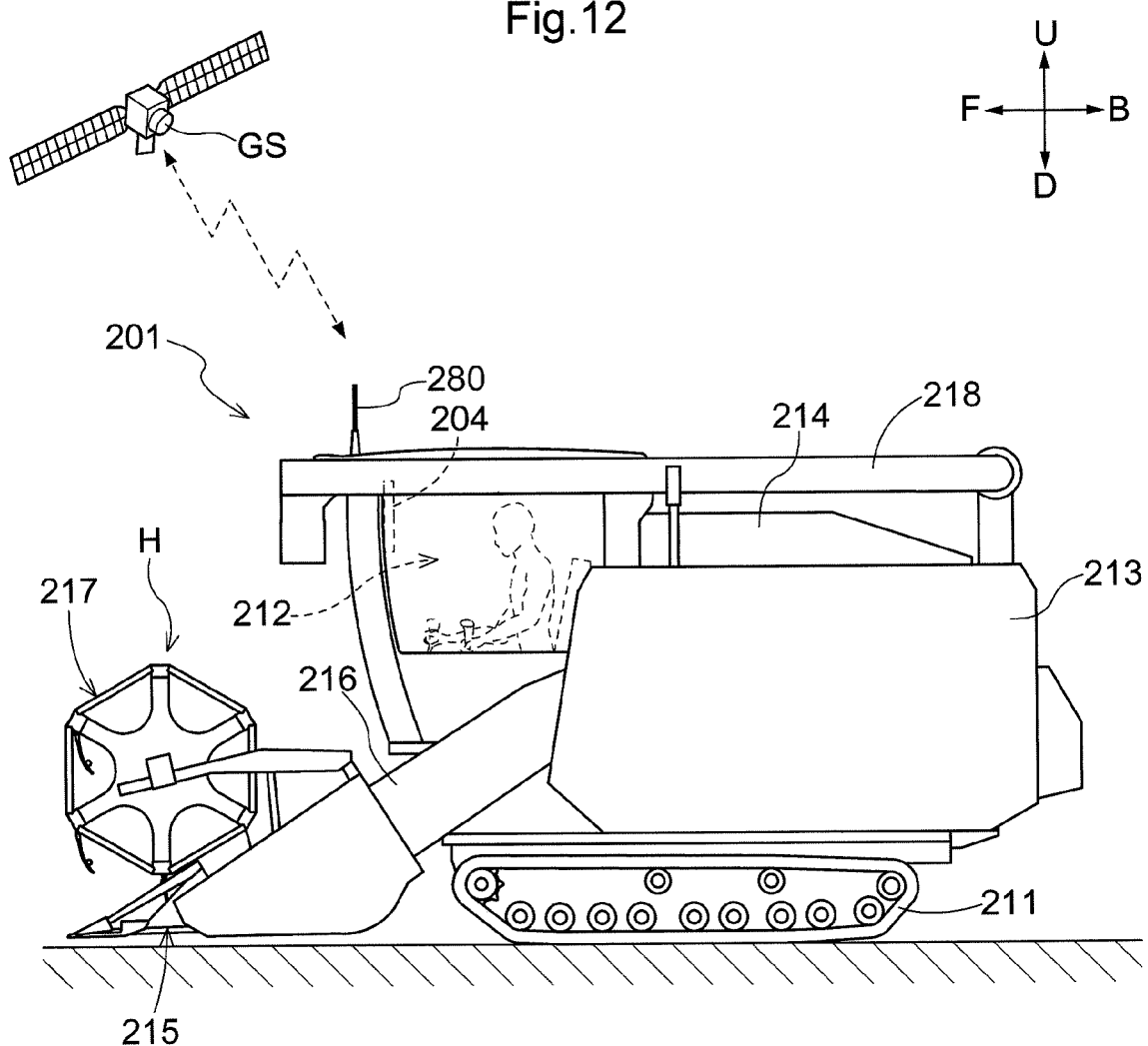
FIG. 12 is a left side view of a combine according to a third embodiment (the same follows up to FIG. 23).

The following describes a third embodiment of the present invention with reference to FIGS. 12 to 23. Note that in direction-related descriptions, the directions indicated by an arrow F and an arrow B in FIG. 12 are "front" and "back" respectively. Also, the directions indicated by an arrow U and an arrow D in FIG. 12 are "up" and "down".

Overall Configuration of Combine

As shown in FIG. 12, a normal-type combine 201 includes a crawler-type traveling device 211, a driver portion 212, a threshing device 213, a grain tank 214, a harvesting device H, a conveying device 216, a grain discharge device 218, and a satellite positioning module 280.

The traveling device 211 is provided in a lower portion of the combine 201. The combine 201 is capable of traveling autonomously with use of the traveling device 211.

Also, the driver portion 212, the threshing device 213, and the grain tank 214 are provided on the upper side of the traveling device 211. A worker who supervises the operation of the combine 201 can board the driver portion 212. Note that the worker may supervise the operation of the combine 201 from outside the combine 201.

The grain discharge device 218 is provided above the grain tank 214. Also, the satellite positioning module 280 is attached to the upper surface of the driver portion 212.

The harvesting device H is provided in the front portion of the combine 201. The conveying device 216 is provided rearward of the harvesting device H. Also, the harvesting device H has a reaping device 215 and a reel 217.

The reaping device 215 reaps a planted grain in a field. The reel 217 is driven to rotate so as to rake in the planted grain that is to be harvested. According to this configuration, the harvesting device H harvests a grain in a field. The combine 201 can perform traveling reaping in which a planted grain in a field is reaped with use of the reaping device 215 while traveling with use of the traveling device 211.

The reaped grain that has been reaped by the reaping device 215 is conveyed to the threshing device 213 by the conveying device 216. The reaped grain is subjected to threshing processing in the threshing device 213. The grain obtained by the threshing processing is stored in the grain tank 214. The grain stored in the grain tank 214 is discharged to an external unit by the grain discharge device 218 as necessary.

In this way, the combine 201 includes the grain tank 214 that stores a grain.

Also, as shown in FIG. 12, a communication terminal 204 is disposed in the driver portion 212. The communication terminal 204 is configured to be able to display various types of information. In the present embodiment, the communication terminal 204 is fixed to the driver portion 212. However, the present invention is not limited to this, and the communication terminal 204 may be configured so as to be detachable from the driver portion 212, or the communication terminal 204 may be located outside of the combine 201.

Figure 14:
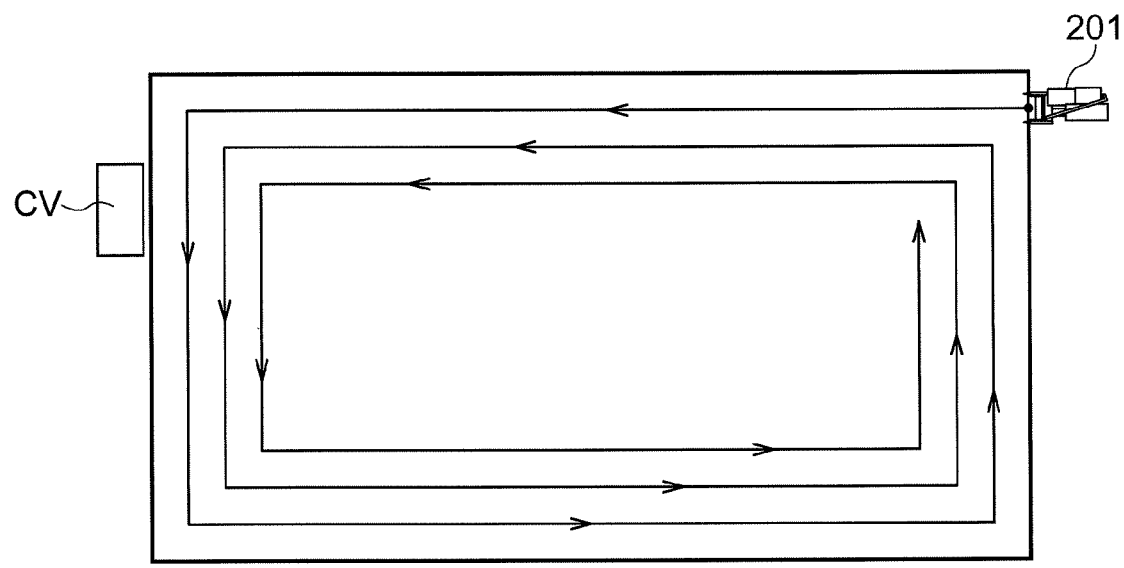
FIG. 14 is a diagram showing loop traveling in a field.
Figure 16:
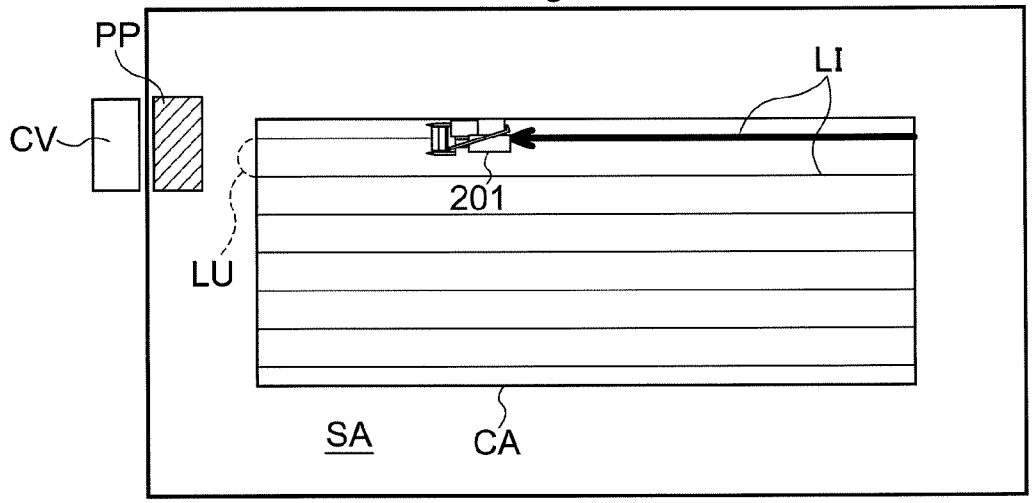
FIG. 16 is a diagram showing traveling reaping performed along a traveling reaping path.

Here, the combine 201 is configured to harvest grain in a field by traveling in loops while harvesting the grain in a peripheral area in a field as shown in FIG. 14, and then performing traveling reaping in an inward region in the field as shown in FIG. 16.

When this harvesting work is performed, the combine 201 is controlled by a combine control system A. The following describes the configuration of the combine control system A.

Configuration of Combine Control System

Figure 13:
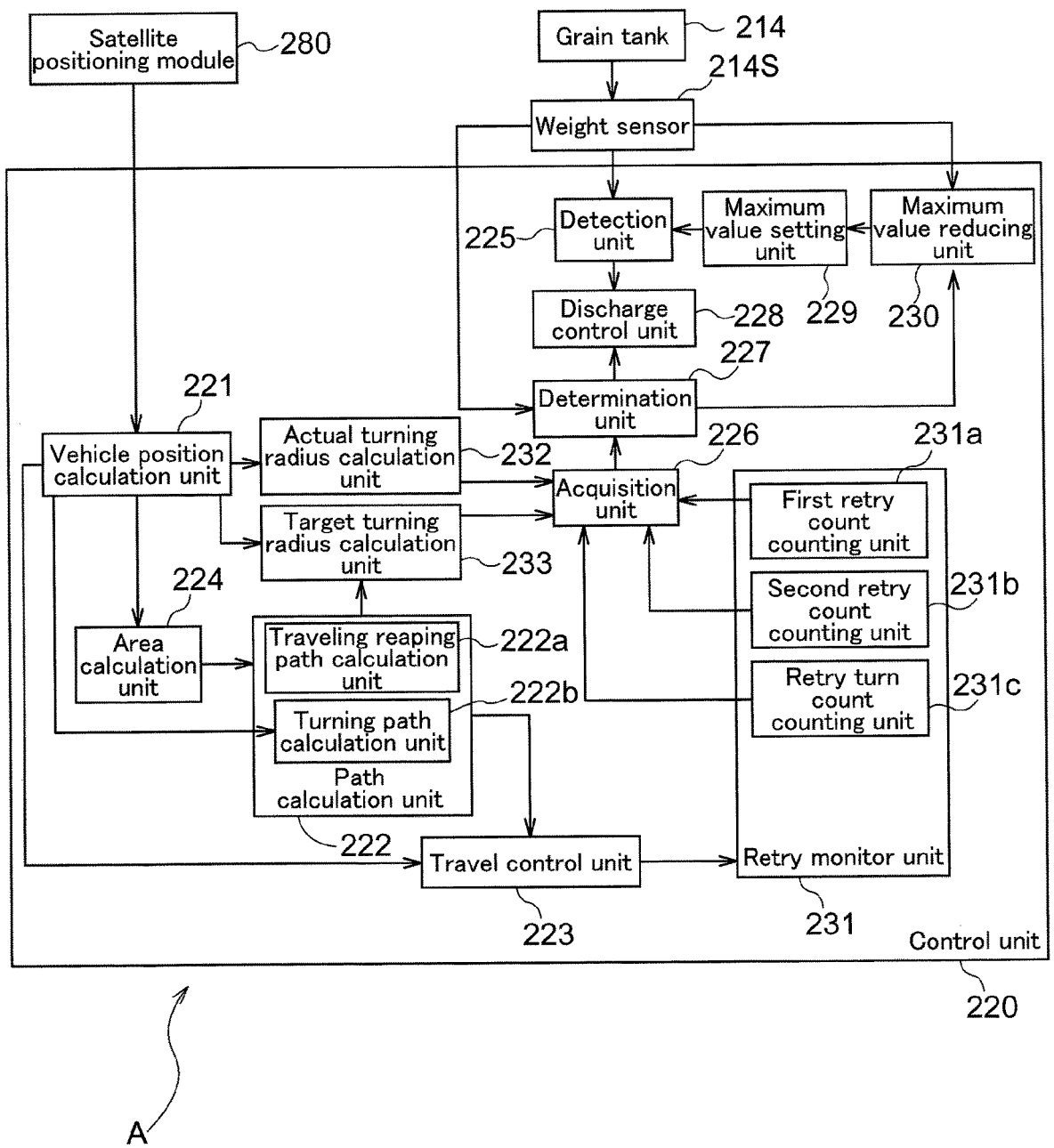
FIG. 13 is a block diagram showing a configuration related to a control unit.

As shown in FIG. 13, the combine control system A includes the satellite positioning module 280, the control unit 220, and a weight sensor 214S. Note that the control unit 220 and the weight sensor 214S are provided in the combine 201. As described above, the satellite positioning module 280 is also provided in the combine 201.

The control unit 220 includes a vehicle position calculation unit 221, a path calculation unit 222, a travel control unit 223, an area calculation unit 224, a detection unit 225, an acquisition unit 226, a determination unit 227, a discharge control unit 228, a maximum value setting unit 229, a maximum value reducing unit 230, a retry monitor unit 231, an actual turning radius calculation unit 232, and a target turning radius calculation unit 233.

As shown in FIG. 12, the satellite positioning module 280 receives GPS signals from satellites GS used in GPS (Global Positioning System). As shown in FIG. 13, the satellite positioning module 280 obtains positioning data that indicates the vehicle position of the combine 201 based on the received GPS signals, and sends the positioning data to the vehicle position calculation unit 221.

The vehicle position calculation unit 221 calculates, over time, the position coordinates of the combine 201 based on the positioning data output by the satellite positioning module 280. The calculated time-based position coordinates of the combine 201 are sent to the travel control unit 223, the area calculation unit 224, the actual turning radius calculation unit 232, and the target turning radius calculation unit 233.

Figure 15:
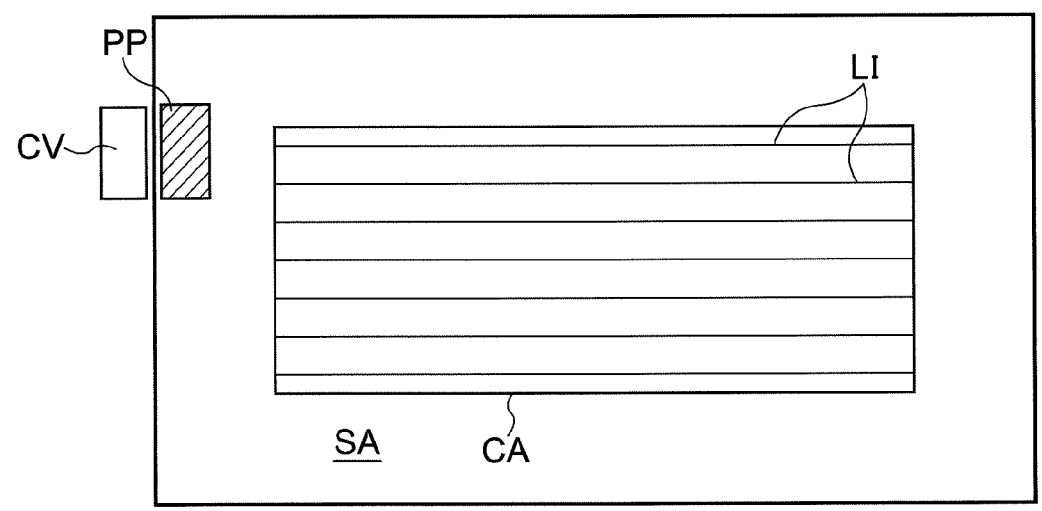
FIG. 15 is a diagram showing a peripheral area and a work target area.

As shown in FIG. 15, the area calculation unit 224 calculates a peripheral area SA and a work target area CA based on the time-based position coordinates of the combine 201 received from the vehicle position calculation unit 221.

More specifically, the area calculation unit 224 calculates the traveling locus of the combine 201 during loop traveling in the periphery of the field based on the time-based position coordinates of the combine 201 received from the vehicle position calculation unit 221. Then, based on the calculated traveling locus of the combine 201, the area calculation unit 224 calculates, as the peripheral area SA, the peripheral area of the field in which the combine 201 is traveling in loops while harvesting grain. The area calculation unit 224 also calculates the area inward of the calculated peripheral area SA as the work target area CA.

For example, in FIG. 14, arrows indicate the traveling path of the combine 201 during loop traveling in the periphery of the field. In the example in FIG. 14, the combine 201 makes three traveling loops. When traveling reaping performed along this traveling path is complete, the field is in the state shown in FIG. 15.

As shown in FIG. 15, the area calculation unit 224 calculates, as the peripheral area SA, the peripheral area of the field in which the combine 201 traveled in loops while harvesting grain. The area calculation unit 224 also calculates the area inward of the calculated peripheral area SA as the work target area CA.

Then, as shown in FIG. 13, the calculation result obtained by the area calculation unit 224 is sent to the path calculation unit 222.

As shown in FIG. 13, the path calculation unit 222 includes a traveling reaping path calculation unit 222a and a turning path calculation unit 222b. As shown in FIG. 15, based on the calculation result received from the area calculation unit 224, the traveling reaping path calculation unit 222a calculates traveling reaping paths LI, which are traveling paths for traveling reaping in the work target area CA. Note that as shown in FIG. 15, in the present embodiment, the traveling reaping paths LI are parallel lines that are parallel with each other.

As shown in FIG. 13, the traveling reaping paths LI calculated by the traveling reaping path calculation unit 222a are sent to the travel control unit 223.

The travel control unit 223 controls the autonomous traveling of the combine 201 based on the position coordinates of the combine 201 received from the vehicle position calculation unit 221 and the traveling reaping paths LI received from the traveling reaping path calculation unit 222a. More specifically, as shown in FIG. 16, the travel control unit 223 controls the traveling of the combine 201 such that traveling reaping is performed by autonomous traveling along the traveling reaping paths LI.

Also, as shown in FIG. 13, the turning path calculation unit 222b is configured to receive the position coordinates of the combine 201 from the vehicle position calculation unit 221. As shown in FIG. 16, the turning path calculation unit 222b calculates a U-turn path LU (corresponding to a "turning path" of the present invention) in the peripheral area SA based on the position coordinates of the combine 201 received from the vehicle position calculation unit 221 and the calculation result received from the area calculation unit 224.

More specifically, as shown in FIG. 16, the U-turn path LU is calculated so as to each connect the end portions of two traveling reaping paths LI in a U-shaped manner. The turning path calculation unit 222b calculates the U-turn path LU so as to connect the traveling reaping path LI that is currently traveled by the combine 201 and the traveling reaping path LI that the combine 201 is planned to travel next.

Note that in the present embodiment, the U-turn path LU is semi-circular. However, the present invention is not limited to this. For example, the U-turn path LU may be shaped as a "U" that includes a straight portion. Also, the U-turn path LU is not limited to being a traveling path that connects two traveling reaping paths LI that are adjacent to each other, and may be a traveling path that connects two traveling reaping paths LI that have one or more traveling reaping paths LI therebetween.

As shown in FIG. 13, the U-turn path LU calculated by the turning path calculation unit 222b is sent to the travel control unit 223.

The travel control unit 223 controls the autonomous traveling of the combine 201 based on the position coordinates of the combine 201 received from the vehicle position calculation unit 221 and the U-turn path LU received from the turning path calculation unit 222b. More specifically, the travel control unit 223 controls the traveling of the combine 201 such that turning is performed by autonomous traveling along the U-turn path LU.

Also, the weight sensor 214S detects the storage weight of grain in the grain tank 214. The detection result obtained by the weight sensor 214S is sent to the detection unit 225, the determination unit 227, and the maximum value reducing unit 230.

The maximum value setting unit 229 sets a maximum value for the storage weight of grain in the grain tank 214. The maximum value set by the maximum value setting unit 229 is sent to the detection unit 225.

The detection unit 225 monitors whether or not the storage weight of grain in the grain tank 214 has reached the maximum value, based on the detection result received from the weight sensor 214S and the maximum value received from the maximum value setting unit 229. If the storage weight of grain in the grain tank 214 has reached the maximum value, the detection unit 225 detects that the storage weight of grain in the grain tank 214 has reached the maximum value.

In this way, the combine control system A includes the detection unit 225 that can detect that the storage weight of grain in the grain tank 214 has reached the maximum value.

The detection result obtained by the detection unit 225 is sent to the discharge control unit 228.

If the detection unit 225 has detected that the storage weight of grain in the grain tank 214 has reached the maximum value, the discharge control unit 228 causes the combine 201 to start to perform a grain discharge operation. Note that this grain discharge operation is an operation for discharging grain from the grain tank 214.

Flow of Harvesting Work Performed Using Combine Control System

The following describes a flow in the case where the combine 201 performs harvesting work in the field shown in FIG. 14, as an example of harvesting work performed using the combine control system A.

First, the worker manually operates the combine 201 so as to perform traveling reaping in which the combine 201 travels in loops along the field boundary line in a peripheral portion inside the field, as shown in FIG. 14. In the example in FIG. 14, the combine 201 makes three traveling loops. When this loop traveling is complete, the field is in the state shown in FIG. 15.

The area calculation unit 224 calculates the traveling locus of the combine 201 in the loop traveling shown in FIG. 14 based on the time-based position coordinates of the combine 201 received from the vehicle position calculation unit 221. As shown in FIG. 15, the area calculation unit 224 also calculates, as the peripheral area SA, the peripheral area of the field in which the combine 201 is traveling in loops while reaping the planted grain, based on the calculated traveling locus of the combine 201. The area calculation unit 224 also calculates the area inward of the calculated peripheral area SA as the work target area CA.

Next, as shown in FIG. 15, the traveling reaping path calculation unit 222a sets traveling reaping paths LI in the work target area CA based on the calculation result received from the area calculation unit 224.

Then, when the worker presses an autonomous traveling start button (not shown), the combine 201 starts to travel autonomously along the traveling reaping paths LI as shown in FIG. 16. At this time, the travel control unit 223 controls the traveling of the combine 201 such that traveling reaping is performed by autonomous traveling along the traveling reaping paths LI.

When autonomous traveling along the traveling reaping paths LI is started, the turning path calculation unit 222b calculates a U-turn path LU in the peripheral area SA as shown in FIG. 16. The turning path calculation unit 222b calculates the U-turn path LU so as to connect the traveling reaping path LI that is currently traveled by the combine 201 and the traveling reaping path LI that the combine 201 is planned to travel next.

When the combine 201 reaches the end portion of the traveling reaping path LI that is currently being traveled, the travel control unit 223 controls the traveling of the combine 201 so as to make a turn by traveling autonomously along the U-turn path LU. Accordingly, the combine 201 can move from the end portion of the currently-traveled traveling reaping path LI to the end portion of the traveling reaping path LI that is planned to be traveled next.

When the combine 201 has moved to the end portion of the traveling reaping path LI that is planned to be traveled next, and has restarted traveling reaping along the traveling reaping path LI, the turning path calculation unit 222b then again calculates a U-turn path LU so as to connect the traveling reaping path LI that is currently traveled by the combine 201 and the traveling reaping path LI that the combine 201 is planned to travel next.

Accordingly, if the combine 201 is traveling the traveling reaping path LI that is first in the travel order among the traveling reaping paths LI for example, the turning path calculation unit 222b calculates a U-turn path LU that connects the traveling reaping path LI that is first in the travel order and the traveling reaping path LI that is second in the travel order.

Also, if the combine 201 is traveling the traveling reaping path LI that is second in the travel order among the traveling reaping paths LI for example, the turning path calculation unit 222b calculates a U-turn path LU that connects the traveling reaping path LI that is second in the travel order and the traveling reaping path LI that is third in the travel order.

Note that in the present embodiment, a cargo vehicle CV is parked outside the field as shown in FIGS. 14 to 16. Also, a parking position PP has been set in the peripheral area SA, in the vicinity of the cargo vehicle CV.

Note that the cargo vehicle CV can collect and transport grain that the combine 201 has discharged from the grain discharge device 218. When grain is to be discharged, the combine 201 parks at the parking position PP and then discharges the grain to the cargo vehicle CV with use of the grain discharge device 218.

The combine 201 continues to perform traveling reaping, and then when the storage weight of grain in the grain tank 214 reaches the maximum value, the detection unit 225 detects that the storage weight of grain in the grain tank 214 has reached the maximum value.

Figure 17:
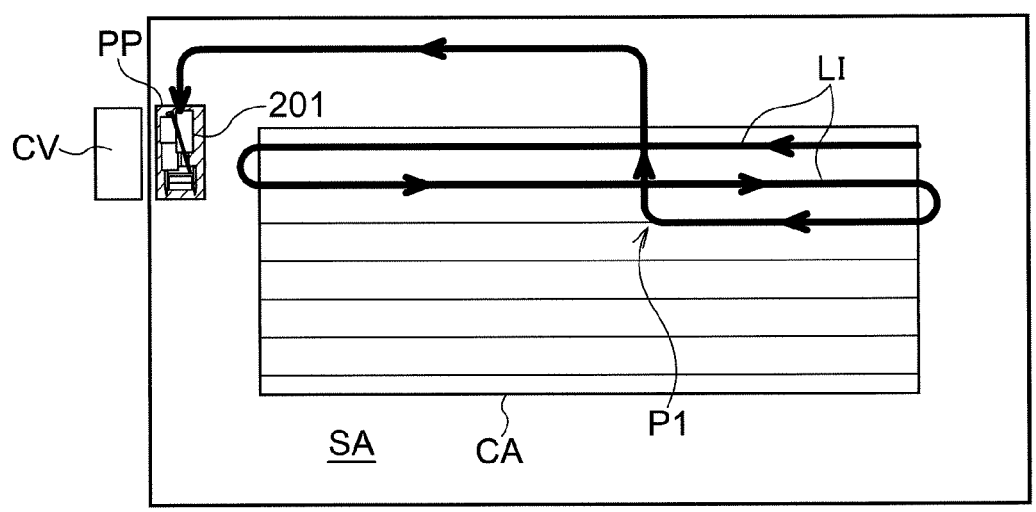
FIG. 17 is a diagram showing how the combine exits the traveling reaping path.

When the detection unit 225 has detected that the storage weight of grain in the grain tank 214 has reached the maximum value, the discharge control unit 228 causes the combine 201 to start performing a grain discharge operation as shown in FIG. 17.

Note that in the present embodiment, it is assumed that the detection unit 225 detects that the storage weight of grain in the grain tank 214 has reached the maximum value at a position P1 that is on one of the traveling reaping paths LI shown in FIG. 17. Accordingly, as shown in FIG. 17, the combine 201 starts to perform the grain discharge operation at the position P1 on the traveling reaping path LI.

More specifically, the combine 201 exits the traveling reaping path LI at the position P1 on the traveling reaping path LI. Next, the combine 201 travels to the peripheral area SA in order to move to the parking position PP. The combine 201 then parks at the parking position PP and discharges the grain to the cargo vehicle CV with use of the grain discharge device 218.

Figure 18:
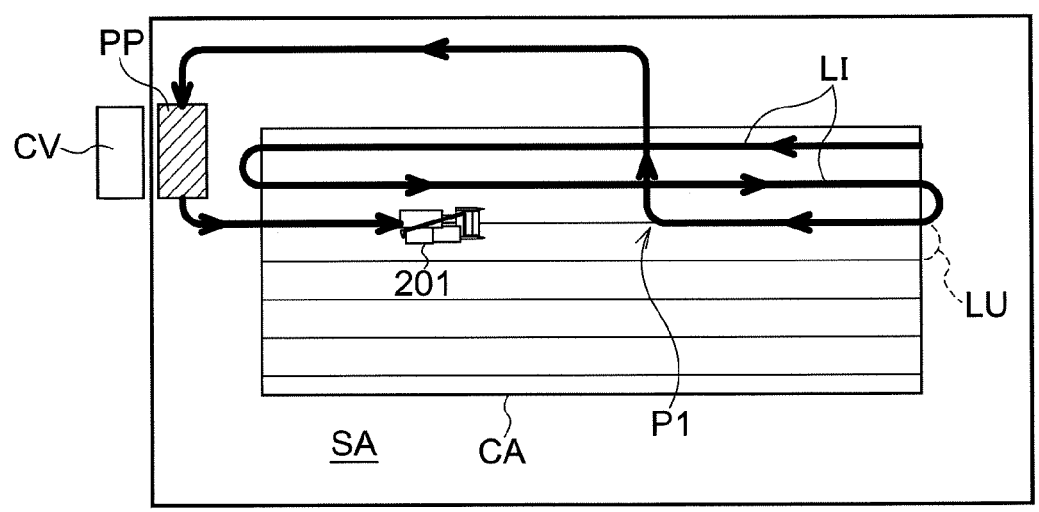
FIG. 18 is a diagram showing how the combine returns to autonomous traveling along the traveling reaping path.

After discharging the grain, the combine 201 returns to autonomous traveling along the traveling reaping path LI as shown in FIG. 18. When traveling reaping is complete for all of the traveling reaping paths LI in the work target area CA, it is deemed that the entirety of the field has been harvested.

Configurations Related to Determination Unit and Maximum Value Reducing Unit

Figure 19:
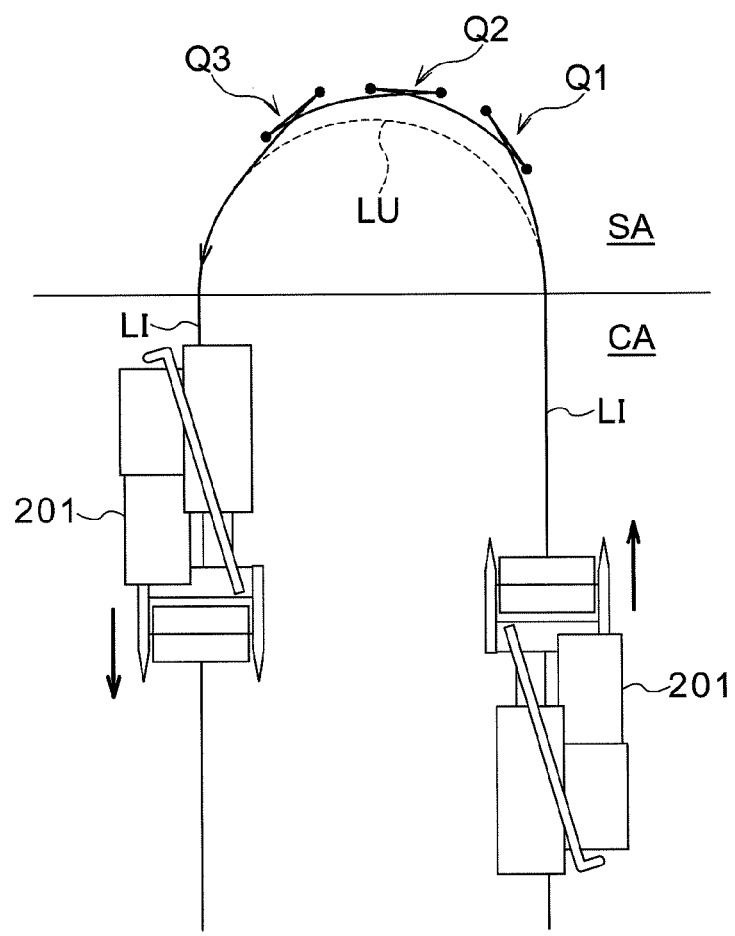
FIG. 19 is a diagram showing a turning operation in which retries are performed.

When the combine 201 performs the operation of turning along the U-turn path LU, there are cases where the combine 201 deviates from the U-turn path LU. If the combine 201 deviates from the U-turn path LU, the travel control unit 223 controls the combine 201 such that the combine 201 performs a retry as shown in FIG. 19. A retry is an operation in which the combine stops during a turn, reverses, and then makes the turn again.

In a case of causing the combine 201 to execute a retry, the travel control unit 223 sends a retry execution signal to the retry monitor unit 231 as shown in FIG. 13. This signal includes information that indicates a position at which the retry is to be executed in the field.

Here, the retry monitor unit 231 includes a first retry count counting unit 231a, a second retry count counting unit 231b, and a retry turn count counting unit 231c. The first retry count counting unit 231a increments a first retry count based on signals received from the travel control unit 223. Note that the first retry count is the number of retries executed by the combine 201 on one U-turn path LU.

The acquisition unit 226 is configured to acquire the first retry count from the first retry count counting unit 231a. The acquired first retry count is sent from the acquisition unit 226 to the determination unit 227.

In this way, the acquisition unit 226 is configured to acquire the first retry count, which is the number of retries executed by the combine 201 in one U-turn path LU.

The determination unit 227 determines whether or not the turning precision of the combine 201 has decreased, based on the detection result received from the weight sensor 214S and the first retry count received from the acquisition unit 226.

More specifically, the determination unit 227 determines that the turning precision of the combine 201 has decreased if the storage weight of grain in the grain tank 214 is greater than or equal to a predetermined weight, and furthermore the first retry count has reached a predetermined first value.

For example, the predetermined weight may be the weight of the amount of grain at 50% of the storage space in the grain tank 214, or may be another weight.

Also, in the present embodiment, the first value is set to 4. However, the present invention is not limited to this, and the first value may be a value other than 4.

Also, the turning precision indicates how small the deviation of the actual turning track from the planned turning path is. In particular, the term "turning precision" in the present embodiment means how small the deviation of the actual turning track of the combine 201 from the U-turn path LU is.

As shown in FIG. 13, the determination result obtained by the determination unit 227 is sent to the discharge control unit 228 and the maximum value reducing unit 230.

If the determination unit 227 determines that the turning precision of the combine 201 has decreased, the maximum value reducing unit 230 sends, to the maximum value setting unit 229, an instruction signal for changing the maximum value of the grain storage weight to the grain storage weight that was detected at the time when the determination unit 227 determined that the turning precision of the combine 201 has decreased. The maximum value setting unit 229 sets the maximum value of the grain storage weight again in accordance with the instruction signal. Accordingly, the maximum value of the grain storage weight decreases.

In this way, the combine control system A includes the maximum value reducing unit 230 that reduces the maximum value if the determination unit 227 determined that the turning precision of the combine 201 has decreased. Also, if the determination unit 227 determines that the turning precision of the combine 201 has decreased, the maximum value reducing unit 230 changes the maximum value to the storage weight of grain in the grain tank 214 that was detected at the time when the determination unit 227 determined that the turning precision of the combine 201 has decreased.

Also, if the determination unit 227 determines that the turning precision of the combine 201 has decreased, the discharge control unit 228 causes the combine 201 to start performing the grain discharge operation.

In this way, the combine control system A includes the discharge control unit 228 that causes the grain discharge operation to be started if the determination unit 227 determines that the turning precision of the combine 201 has decreased.

In the example in FIG. 19, the combine 201 is performing the turning operation along one U-turn path LU. At this time, it is assumed that the storage weight of grain in the grain tank 214 is greater than or equal to the predetermined weight. In this turning operation, the combine 201 deviates from the U-turn path LU, and thus performs a retry at a position Q1, a position Q2, and a position Q3. As shown in FIG. 19, in the retry performed at the position Q3, the combine 201 returns to the U-turn path LU.

In other words, in the example shown in FIG. 19, the first retry count is 3. Here, as described above, the first value has been set to 4 in the present embodiment. The first retry count therefore has not reached the first value. For this reason, the determination unit 227 determines that the turning precision of the combine 201 has not decreased.

Figure 20:
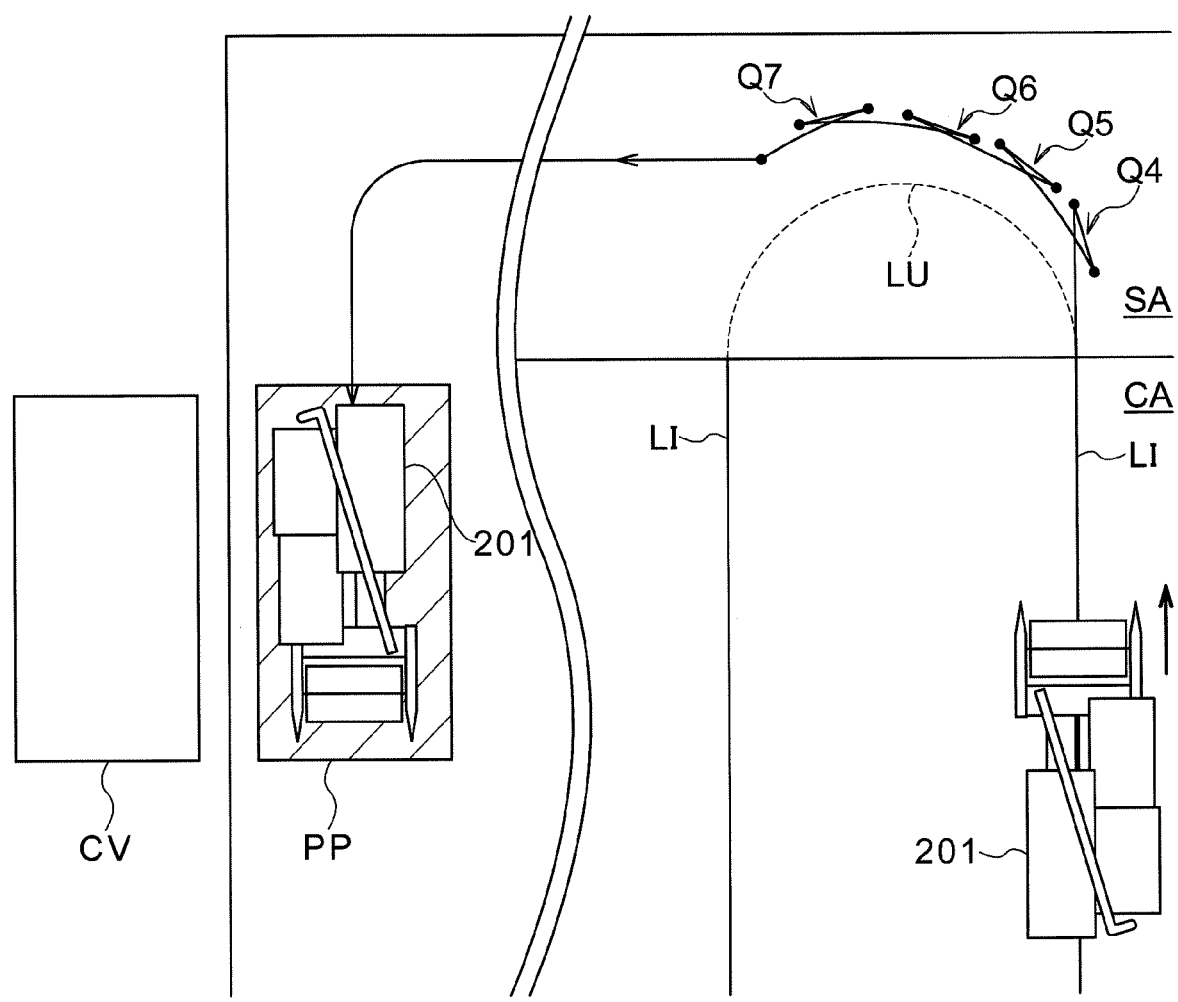
FIG. 20 is a diagram showing an example of a case where a first retry count reaches a first value.

In the example in FIG. 20, the combine 201 is performing the turning operation along one U-turn path LU. At this time, it is assumed that the storage weight of grain in the grain tank 214 is greater than or equal to the predetermined weight. In this turning operation, the combine 201 deviates from the U-turn path LU, and thus performs a retry at a position Q4, a position Q5, a position Q6, and a position Q7.

In other words, in the example shown in FIG. 20, the first retry count has reached 4. For this reason, the determination unit 227 determines that the turning precision of the combine 201 has decreased.

When the determination unit 227 has determined that the turning precision of the combine 201 has decreased, the maximum value reducing unit 230 sends, to the maximum value setting unit 229, the instruction signal for changing the maximum value of the grain storage weight to the current grain storage weight. The maximum value setting unit 229 sets the maximum value of the grain storage weight again in accordance with the instruction signal. Accordingly, the maximum value of the grain storage weight decreases.

At the same time, the discharge control unit 228 causes the combine 201 to start performing the grain discharge operation. Accordingly, immediately after the fourth retry, the combine 201 stops the turning operation and moves to the parking position PP. The combine 201 then parks at the parking position PP and discharges the grain to the cargo vehicle CV with use of the grain discharge device 218.

Also, the second retry count counting unit 231b shown in FIG. 13 increments the second retry count based on signals received from the travel control unit 223. Note that the second retry count is the cumulative number of retries in the turning operations performed by the combine 201.

The acquisition unit 226 is configured to acquire the second retry count from the second retry count counting unit 231b. The acquired second retry count is sent from the acquisition unit 226 to the determination unit 227.

In this way, the acquisition unit 226 is configured to acquire the second retry count, which is the cumulative number of retries in the turning operations performed by the combine 201.

The determination unit 227 determines whether or not the turning precision of the combine 201 has decreased, based on the detection result received from the weight sensor 214S and the second retry count received from the acquisition unit 226.

More specifically, the determination unit 227 determines that the turning precision of the combine 201 has decreased if the storage weight of grain in the grain tank 214 is greater than or equal to a predetermined weight, and furthermore the second retry count has reached a predetermined second value.

Also, in the present embodiment, the second value is set to 6. However, the present invention is not limited to this, and the second value may be a value other than 6.

Also, the retry turn count counting unit 231c increments the retry turn count based on signals received from the travel control unit 223. Note that the retry turn count is the number of turning operations in which a retry was performed among the turning operations performed by the combine 201.

The acquisition unit 226 is configured to acquire the retry turn count from the retry turn count counting unit 231c. The acquired retry turn count is sent from the acquisition unit 226 to the determination unit 227.

In this way, the acquisition unit 226 is configured to acquire the retry turn count, which is the number of turning operations in which a retry was performed among the turning operations performed by the combine 201.

The determination unit 227 determines whether or not the turning precision of the combine 201 has decreased, based on the detection result received from the weight sensor 214S and the retry turn count received from the acquisition unit 226.

More specifically, the determination unit 227 determines that the turning precision of the combine 201 has decreased if the storage weight of grain in the grain tank 214 is greater than or equal to a predetermined weight, and furthermore the retry turn count has reached a predetermined third value.

Also, in the present embodiment, the third value is set to 4. However, the present invention is not limited to this, and the third value may be a value other than 4.

Figure 21:
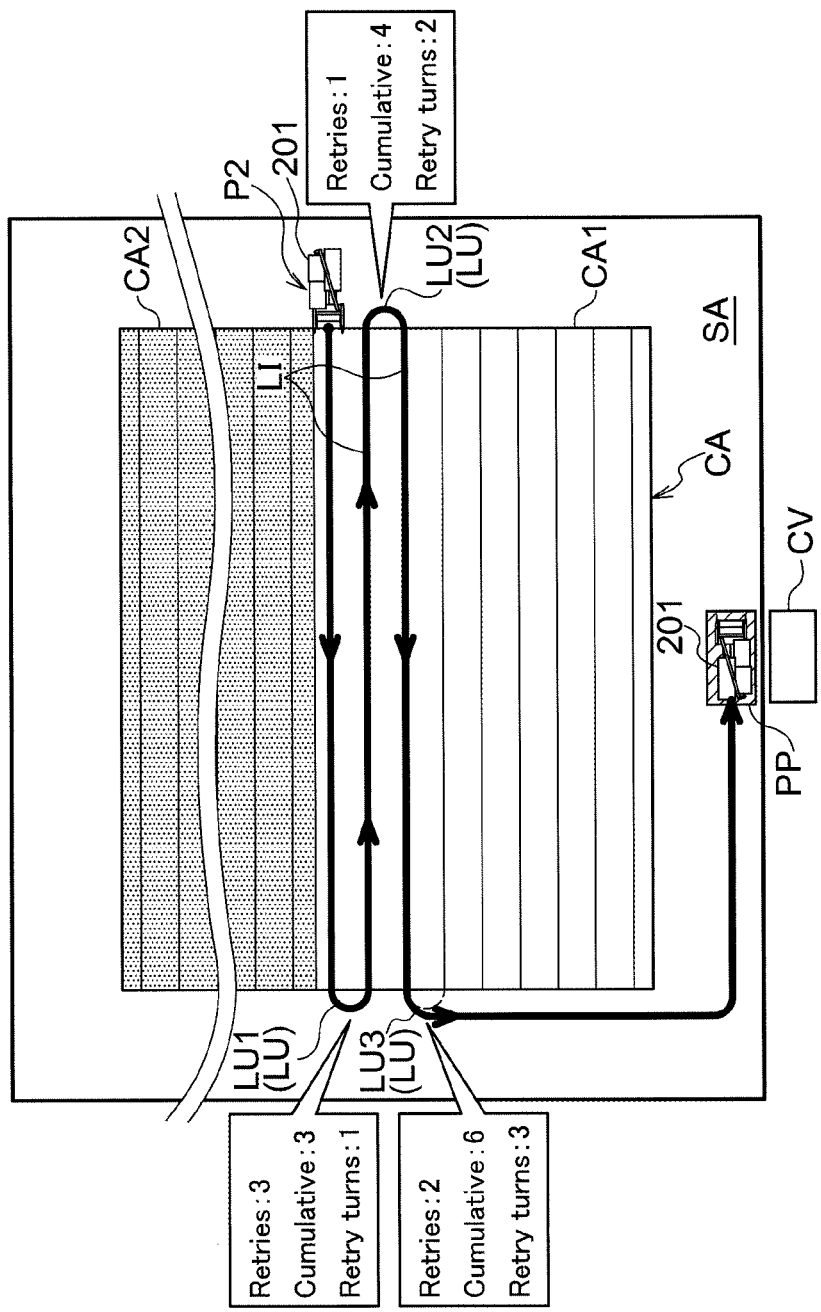
FIG. 21 is a diagram showing an example of a case where a second retry count reaches a second value.

Next, the following describes a flow in the case where the combine 201 performs harvesting work in the field shown in FIG. 21, as an example of a case where the second retry count reaches the second value.

In the example in FIG. 21, the combine 201 is performing harvesting work in a field. The work target area CA shown in FIG. 21 includes a reaped area CA2 in which reaping operations have already been completed. The combine 201 reaps planted grain in an unreaped area CA1 in the work target area CA.

At the time when the combine 201 is located at a position P2 shown in FIG. 21, the storage weight of grain in the grain tank 214 of the combine 201 is greater than or equal to the predetermined weight. Under control of the travel control unit 223, the combine 201 at the position P2 then performs traveling reaping along the traveling reaping paths LI.

In the example shown in FIG. 21, three U-turn paths LU are calculated as traveling reaping is performed along the traveling reaping paths LI, namely a first U-turn path LU1, a second U-turn path LU2, and a third U-turn path LU3.

As shown in FIG. 21, the combine 201 at the position P2 performs traveling reaping along the traveling reaping path LI, and then performs the turning operation on the first U-turn path LU1. It is assumed here that the combine 201 has not performed any retries in turning operations performed in the field before this turning operation on the first U-turn path LU1.

In the example shown in FIG. 21, three retries are performed in the turning operation on the first U-turn path LU1. Here, as described above, the first value has been set to 4 in the present embodiment. In other words, on the first U-turn path LU1, the first retry count has not reached the first value.

Also, the second retry count obtained by the second retry count counting unit 231b is three in the turning operation on the first U-turn path LU1. Here, as described above, the second value has been set to 6 in the present embodiment. In other words, in the turning operation on the first U-turn path LU1, the second retry count has not reached the second value.

Also, the retry turn count obtained by the retry turn count counting unit 231c is one in the turning operation on the first U-turn path LU1. Here, as described above, the third value has been set to 4 in the present embodiment. In other words, in the turning operation on the first U-turn path LU1, the retry turn count has not reached the third value.

Accordingly, the determination unit 227 determines that the turning precision of the combine 201 has not decreased in the turning operation on the first U-turn path LU1.

Next, the combine 201 performs traveling reaping along the next traveling reaping path LI, and then performs a turning operation on the second U-turn path LU2. In the example shown in FIG. 21, one retry is performed in the turning operation on the second U-turn path LU2.

In other words, on the second U-turn path LU2, the first retry count has not reached the first value.

Also, the second retry count obtained by the second retry count counting unit 231b is four in the turning operation on the second U-turn path LU2. In other words, in the turning operation on the second U-turn path LU2, the second retry count has not reached the second value.

Also, the retry turn count obtained by the retry turn count counting unit 231c is two in the turning operation on the second U-turn path LU2. In other words, in the turning operation on the second U-turn path LU2, the retry turn count has not reached the third value.

Accordingly, the determination unit 227 determines that the turning precision of the combine 201 has not decreased in the turning operation on the second U-turn path LU2.

Next, the combine 201 performs traveling reaping along the next traveling reaping path LI, and then performs a turning operation on the third U-turn path LU3. In the example shown in FIG. 21, two retries are performed in the turning operation on the third U-turn path LU3.

At the time when the second retry is performed on the third U-turn path LU3, the first retry count has not reached the first value on the third U-turn path LU3.

Also, the retry turn count obtained by the retry turn count counting unit 231c is three in the turning operation on the third U-turn path LU3. In other words, in the turning operation on the third U-turn path LU3, the retry turn count has not reached the third value.

However, at the time when the second retry is performed on the third U-turn path LU3, the second retry count obtained by the second retry count counting unit 231b reaches six.

Accordingly, the determination unit 227 determines that the turning precision of the combine 201 has decreased in the turning operation on the third U-turn path LU3.

When the determination unit 227 has determined that the turning precision of the combine 201 has decreased, the maximum value reducing unit 230 sends, to the maximum value setting unit 229, the instruction signal for changing the maximum value of the grain storage weight to the current grain storage weight. The maximum value setting unit 229 sets the maximum value of the grain storage weight again in accordance with the instruction signal. Accordingly, the maximum value of the grain storage weight decreases.

At the same time, the discharge control unit 228 causes the combine 201 to start performing the grain discharge operation. Accordingly, immediately after the second retry in the turning operation on the third U-turn path LU3, the combine 201 stops the turning operation and moves to the parking position PP. The combine 201 then parks at the parking position PP and discharges the grain to the cargo vehicle CV with use of the grain discharge device 218.

Figure 22:
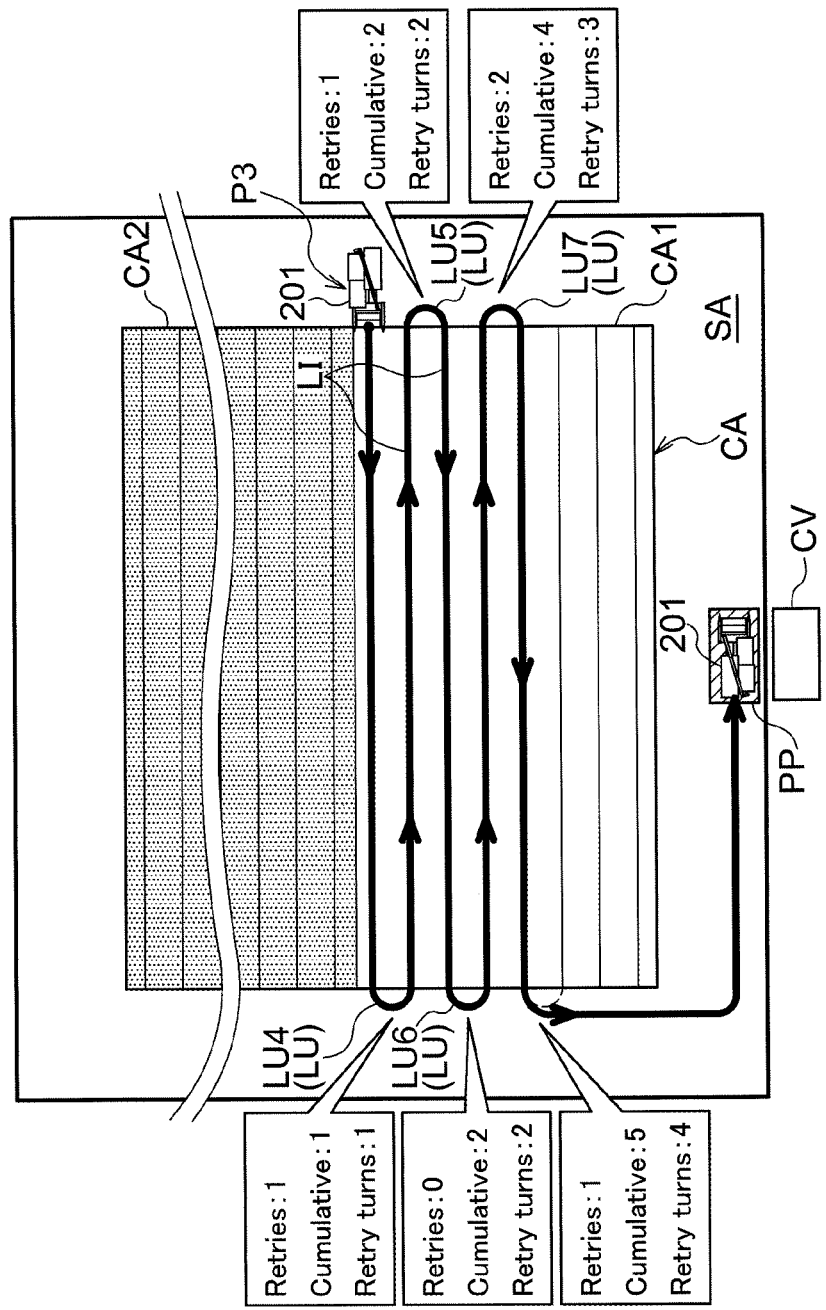
FIG. 22 is a diagram showing an example of a case where a retry turn count reaches a third value.

Next, the following describes a flow in the case where the combine 201 performs harvesting work in the field shown in FIG. 22, as an example of a case where the retry turn count reaches the third value.

In the example in FIG. 22, the combine 201 is performing harvesting work in a field. The work target area CA shown in FIG. 22 includes a reaped area CA2 in which reaping operations have already been completed. The combine 201 reaps planted grain in an unreaped area CA1 in the work target area CA.

At the time when the combine 201 is located at a position P3 shown in FIG. 22, the storage weight of grain in the grain tank 214 of the combine 201 is greater than or equal to the predetermined weight. Under control of the travel control unit 223, the combine 201 at the position P3 then performs traveling reaping along the traveling reaping paths LI.

In the example shown in FIG. 22, five U-turn paths LU are calculated as traveling reaping is performed along the traveling reaping paths LI, namely a fourth U-turn path LU4, a fifth U-turn path LU5, a sixth U-turn path LU6, a seventh U-turn path LU7, and an eighth U-turn path LU8.

As shown in FIG. 22, the combine 201 at the position P3 performs traveling reaping along the traveling reaping path LI, and then performs the turning operation on the fourth U-turn path LU4. It is assumed here that the combine 201 has not performed any retries in turning operations performed in the field before this turning operation on the fourth U-turn path LU4.

In the example shown in FIG. 22, one retry is performed in the turning operation on the fourth U-turn path LU4. Here, as described above, the first value has been set to 4 in the present embodiment. In other words, on the fourth U-turn path LU4, the first retry count has not reached the first value.

Also, the second retry count obtained by the second retry count counting unit 231b is one in the turning operation on the fourth U-turn path LU4. Here, as described above, the second value has been set to 6 in the present embodiment. In other words, in the turning operation on the fourth U-turn path LU4, the second retry count has not reached the second value.

Also, the retry turn count obtained by the retry turn count counting unit 231c is one in the turning operation on the fourth U-turn path LU4. Here, as described above, the third value has been set to 4 in the present embodiment. In other words, in the turning operation on the fourth U-turn path LU4, the retry turn count has not reached the third value.

Accordingly, the determination unit 227 determines that the turning precision of the combine 201 has not decreased in the turning operation on the fourth U-turn path LU4.

Next, the combine 201 performs traveling reaping along the next traveling reaping path LI, and then performs a turning operation on the fifth U-turn path LU5. In the example shown in FIG. 22, one retry is performed in the turning operation on the fifth U-turn path LU5.

In other words, on the fifth U-turn path LU5, the first retry count has not reached the first value.

Also, the second retry count obtained by the second retry count counting unit 231b is two in the turning operation on the fifth U-turn path LU5. In other words, in the turning operation on the fifth U-turn path LU5, the second retry count has not reached the second value.

Also, the retry turn count obtained by the retry turn count counting unit 231c is two in the turning operation on the fifth U-turn path LU5. In other words, in the turning operation on the fifth U-turn path LU5, the retry turn count has not reached the third value.

Accordingly, the determination unit 227 determines that the turning precision of the combine 201 has not decreased in the turning operation on the fifth U-turn path LU5.

Next, the combine 201 performs traveling reaping along the next traveling reaping path LI, and then performs a turning operation on the sixth U-turn path LU6. In the example shown in FIG. 22, no retries are performed in the turning operation on the sixth U-turn path LU6.

In other words, on the sixth U-turn path LU6, the first retry count has not reached the first value.

Also, the second retry count obtained by the second retry count counting unit 231b is not incremented in the turning operation on the sixth U-turn path LU6, and remains two. In other words, in the turning operation on the sixth U-turn path LU6, the second retry count has not reached the second value.

Also, the retry turn count obtained by the retry turn count counting unit 231c is not incremented in the turning operation on the sixth U-turn path LU6, and remains two. In other words, in the turning operation on the sixth U-turn path LU6, the retry turn count has not reached the third value.

Accordingly, the determination unit 227 determines that the turning precision of the combine 201 has not decreased in the turning operation on the sixth U-turn path LU6.

Next, the combine 201 performs traveling reaping along the next traveling reaping path LI, and then performs a turning operation on the seventh U-turn path LU7. In the example shown in FIG. 22, two retries are performed in the turning operation on the seventh U-turn path LU7.

In other words, on the seventh U-turn path LU7, the first retry count has not reached the first value.

Also, the second retry count obtained by the second retry count counting unit 231b is four in the turning operation on the seventh U-turn path LU7. In other words, in the turning operation on the seventh U-turn path LU7, the second retry count has not reached the second value.

Also, the retry turn count obtained by the retry turn count counting unit 231c is three in the turning operation on the seventh U-turn path LU7. In other words, in the turning operation on the seventh U-turn path LU7, the retry turn count has not reached the third value.

Accordingly, the determination unit 227 determines that the turning precision of the combine 201 has not decreased in the turning operation on the seventh U-turn path LU7.

Next, the combine 201 performs traveling reaping along the next traveling reaping path LI, and then performs a turning operation on the eighth U-turn path LU8. In the example shown in FIG. 22, one retry is performed in the turning operation on the eighth U-turn path LU8.

When this retry is performed, the first retry count has not reached the first value. Also, at this time, the second retry count obtained by the second retry count counting unit 231b is five. In other words, at this time, the second retry count has not reached the second value.

However, when this retry is performed, the retry turn count obtained by the retry turn count counting unit 231c reaches four.

Accordingly, the determination unit 227 determines that the turning precision of the combine 201 has decreased in the turning operation on the eighth U-turn path LU8.

When the determination unit 227 has determined that the turning precision of the combine 201 has decreased, the maximum value reducing unit 230 sends, to the maximum value setting unit 229, the instruction signal for changing the maximum value of the grain storage weight to the current grain storage weight. The maximum value setting unit 229 sets the maximum value of the grain storage weight again in accordance with the instruction signal. Accordingly, the maximum value of the grain storage weight decreases.

At the same time, the discharge control unit 228 causes the combine 201 to start performing the grain discharge operation. Accordingly, immediately after the retry in the turning operation on the eighth U-turn path LU8, the combine 201 stops the turning operation and moves to the parking position PP. The combine 201 then parks at the parking position PP and discharges the grain to the cargo vehicle CV with use of the grain discharge device 218.

Also, as described above, the control unit 220 shown in FIG. 13 includes the actual turning radius calculation unit 232 and the target turning radius calculation unit 233.

As shown in FIG. 13, the target turning radius calculation unit 233 acquires the traveling reaping paths LI calculated by the traveling reaping path calculation unit 222a. Also, the target turning radius calculation unit 233 acquires the U-turn path LU calculated by the turning path calculation unit 222b.

The target turning radius calculation unit 233 then calculates the turning radius of the U-turn path LU that is the combine 201 is planned to travel next, based on the traveling reaping paths LI and the U-turn path LU that were acquired and the position coordinates of the combine 201 received from the vehicle position calculation unit 221.

The turning radius calculated by the target turning radius calculation unit 233 is a target turning radius TR for when the combine 201 turns on the next U-turn path LU. In other words, the target turning radius calculation unit 233 calculates the target turning radius TR for when the combine 201 turns on the next U-turn path LU.

Also, the actual turning radius calculation unit 232 calculates an actual turning radius AR of the combine 201 based on the time-based position coordinates of the combine 201 received from the vehicle position calculation unit 221.

The acquisition unit 226 is configured to acquire the calculated target turning radius TR from the target turning radius calculation unit 233. The acquisition unit 226 is also configured to acquire the calculated actual turning radius AR from the actual turning radius calculation unit 232.

In this way, the acquisition unit 226 is configured to acquire the target turning radius TR of the combine 201 and the actual turning radius AR of the combine 201.

The target turning radius TR and the actual turning radius AR that were acquired are sent from the acquisition unit 226 to the determination unit 227. The determination unit 227 calculates the difference between the target turning radius TR and the actual turning radius AR.

The determination unit 227 then determines whether or not the turning precision of the combine 201 has decreased, based on the detection result received from the weight sensor 214S and the difference between the target turning radius TR and the actual turning radius AR.

More specifically, the determination unit 227 determines that the turning precision of the combine 201 has decreased if the storage weight of grain in the grain tank 214 is greater than or equal to a predetermined weight, and furthermore the difference between the target turning radius TR and the actual turning radius AR is greater than or equal to a predetermined value. Note that this predetermined value can be appropriately set in accordance with the model of the combine 201, for example.

Figure 23:
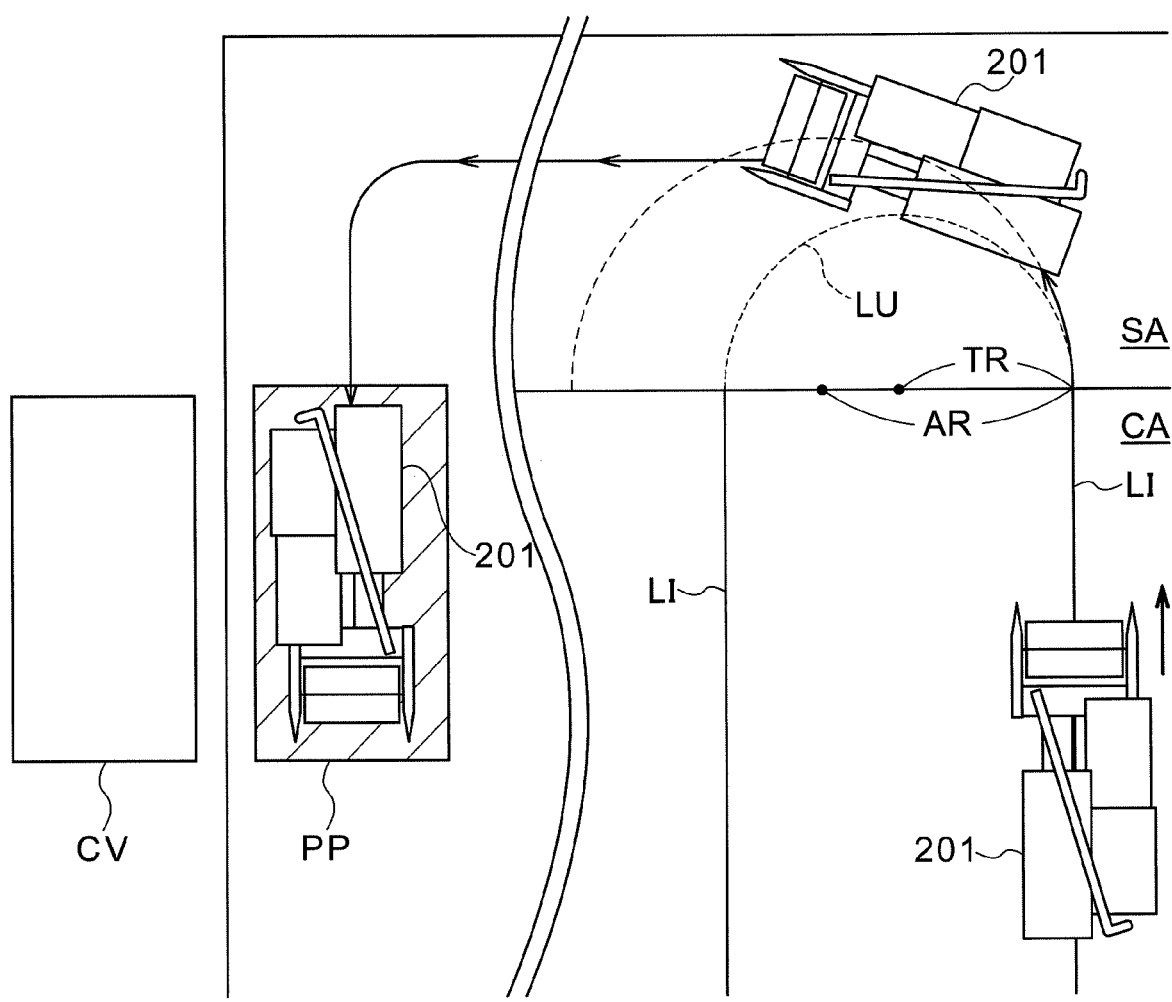
FIG. 23 is a diagram showing an example of a case where the difference between a target turning radius and an actual turning radius is greater than or equal to a predetermined value.

Here, in the example in FIG. 23, the combine 201 is performing the turning operation along one U-turn path LU. At this time, it is assumed that the storage weight of grain in the grain tank 214 is greater than or equal to the predetermined weight.

In the example shown in FIG. 23, the target turning radius TR is calculated by the target turning radius calculation unit 233 before the turning operation is performed along the U-turn path LU. Also, the actual turning radius AR is calculated by the actual turning radius calculation unit 232 after the turning operation has started along the U-turn path LU.

Here, assume that the difference between the target turning radius TR and the actual turning radius AR is greater than or equal to the predetermined value in this turning operation. In other words, the determination unit 227 determines that the turning precision of the combine 201 has decreased during this turning operation.

When the determination unit 227 has determined that the turning precision of the combine 201 has decreased, the maximum value reducing unit 230 sends, to the maximum value setting unit 229, the instruction signal for changing the maximum value of the grain storage weight to the current grain storage weight. The maximum value setting unit 229 sets the maximum value of the grain storage weight again in accordance with the instruction signal. Accordingly, the maximum value of the grain storage weight decreases.

At the same time, the discharge control unit 228 causes the combine 201 to start performing the grain discharge operation. Accordingly, the combine 201 stops the turning operation without making a retry, and moves to the parking position PP. The combine 201 then parks at the parking position PP and discharges the grain to the cargo vehicle CV with use of the grain discharge device 218.

Note that in the example shown in FIG. 23, if the difference between the target turning radius TR and the actual turning radius AR were not greater than or equal to the predetermined value, the combine 201 would perform a retry.

The first retry count, the second retry count, and the retry turn count described above are all information that indicates the turning precision of the combine 201. Accordingly, the first retry count, the second retry count, and the retry turn count all correspond to "turning precision information" of the present invention.

The difference between the target turning radius TR and the actual turning radius AR is also information that indicates the turning precision of the combine 201. Accordingly, the difference between the target turning radius TR and the actual turning radius AR also corresponds to "turning precision information" of the present invention.

In other words, the acquisition unit 226 is configured to acquire turning precision information. Also, the determination unit 227 determines whether or not the turning precision of the combine 201 has decreased, based on the turning precision information acquired by the acquisition unit 226.

In this way, the combine control system A includes the acquisition unit 226 that acquires turning precision information, which is information that indicates the turning precision of the combine 201. The combine control system A also includes the determination unit 227 that determines whether or not the turning precision of the combine 201 has decreased, based on the turning precision information acquired by the acquisition unit 226.

According to the configuration described above, if the turning precision of the combine 201 has decreased, the maximum value reducing unit 230 reduces the maximum value of the storage weight of grain in the grain tank 214. Accordingly, the storage weight of grain in the grain tank 214 is less likely to rise to a weight at which the turning precision decreases. In other words, after reducing the maximum value of the storage weight of grain in the grain tank 214, the turning precision of the combine 201 is likely to be ensured.

Therefore, according to the configuration described above, the turning precision of the combine 201 is likely to be ensured.

Variations of Third Embodiment

The following describes variations in which changes have been made to the embodiment described above. The matter other than that described in the following variations is similar to the matter described in the above embodiment. The above embodiment and following variations may be appropriately combined as long as no contradiction arises. Note that the scope of the present invention is not intended to be limited to the above embodiment and following variations.

(1) The traveling device 211 may be a wheel type, or may be a semi-crawler type.

(2) In the above embodiment, the traveling reaping paths LI calculated by the traveling reaping path calculation unit 222a are parallel lines that are parallel to each other, but the present invention is not limited to this, and the traveling reaping paths LI calculated by the traveling reaping path calculation unit 222a are not required to be parallel lines that are parallel to each other. For example, the traveling reaping path LI calculated by the traveling reaping path calculation unit 222a may be a spiral traveling path.

(3) In the above embodiment, the worker manually operates the combine 201 so as to perform traveling reaping in which the combine 201 travels in loops along the field boundary line in a peripheral portion inside the field, as shown in FIG. 14. However, the present invention is not limited to this, and a configuration is possible in which the combine 201 travels autonomously so as to perform traveling reaping in which the combine 201 travels in loops along the field boundary line in a peripheral portion inside the field.

(4) The "turning path" of the present invention is not limited to being a traveling path that connects two traveling reaping paths LI. Any traveling path for turning corresponds to the "turning path" of the present invention. For example, a path for a turn that is made between the exiting of the combine 201 from the traveling reaping path LI and arrival at the parking position PP also corresponds to the "turning path" of the present invention.

(5) The "first retry count" of the present invention is not limited to being the number of retries performed in a traveling path that connects two traveling reaping paths LI. Any value indicating the number of retries in one turning path corresponds to the "first retry count" of the present invention. For example, the number of retries performed on a path for a turn that is made between the exiting of the combine 201 from the traveling reaping path LI and arrival at the parking position PP may also be treated as the first retry count.

(6) The "second retry count" of the present invention is not limited to being the cumulative number of retries performed in turning operations on traveling paths that connect two traveling reaping paths LI. Any value indicating the cumulative number of retries in turning operations performed by the combine 201 corresponds to the "second retry count" of the present invention. For example, the second retry count may include the number of retries performed on a path for a turn that is made between the exiting of the combine 201 from the traveling reaping path LI and arrival at the parking position PP.

(7) The "retry turn count" of the present invention is not limited to being the number of turning operations in which a retry was performed among the turning operations performed in traveling paths that connect two traveling reaping paths LI. Any value that indicates the number of turning operations in which a retry was performed among the turning operations by the combine 201 corresponds to the "retry turn count" of the present invention. For example, the retry turn count may include the number of turning operations in which a retry was performed among the turning operations performed on a path for a turn that is made between the exiting of the combine 201 from the traveling reaping path LI and arrival at the parking position PP.

(8) The "target turning radius" and the "actual turning radius" of the present invention are not limited to being the target turning radius TR and the actual turning radius AR on a traveling path that connects two traveling reaping paths LI. Any target turning radius TR and actual turning radius AR on a turning path of the combine 201 correspond to the "target turning radius" and the "actual turning radius" of the present invention. For example, whether or not the turning precision of the combine 201 has decreased may be determined based on the target turning radius TR and the actual turning radius AR on a path for a turn that is made between the exiting of the combine 201 from the traveling reaping path LI and arrival at the parking position PP.

(9) A turning operation performed along a U-turn path LU may be performed by manual operation of the combine 201 by the worker. In this case, a configuration is possible in which the U-turn path LU calculated by the turning path calculation unit 222b is displayed on the communication terminal 204 for guidance. Also, in this case, when a retry is performed, the retry execution signal may be sent to the retry monitor unit 231 in accordance with a manual operation performed by the worker.

(10) Traveling reaping performed along a traveling reaping path LI may be performed by manual operation of the combine 201 by the worker.

(11) Among the vehicle position calculation unit 221, the path calculation unit 222, the travel control unit 223, the area calculation unit 224, the detection unit 225, the acquisition unit 226, the determination unit 227, the discharge control unit 228, the maximum value setting unit 229, the maximum value reducing unit 230, the retry monitor unit 231, the actual turning radius calculation unit 232, and the target turning radius calculation unit 233, some or all may be provided outside of the combine 201, such as being provided in a management server that is provided outside of the combine 201.

(12) The discharge control unit 228 may be omitted.

(13) A configuration is possible in which, if the determination unit 227 has determined that the turning precision of the combine 201 has decreased, the maximum value reducing unit 230 reduces the maximum value regardless of the storage weight of grain in the grain tank 214 at the time when the determination unit 227 determined that the turning precision of the combine 201 has decreased.

(14) The actual turning radius calculation unit 232 may be omitted.

(15) The target turning radius calculation unit 233 may be omitted.

(16) The first retry count counting unit 231a may be omitted.

(17) The second retry count counting unit 231b may be omitted.

(18) The retry turn count counting unit 231c may be omitted.

(19) The communication terminal 204 may be omitted.

(20) In the above embodiment, the determination unit 227 determines that the turning precision of the combine 201 has decreased if the storage weight of grain in the grain tank 214 is greater than or equal to the predetermined weight, and furthermore the first retry count has reached the predetermined first value. Here, the first value may be set separately for each area in the field. For example, the first value for an area in the north side of the field may be set higher or lower than the first value for an area in the south side of the field. Also, for example, the first value for an area that has a poor field surface condition due to being muddy or the like may be set higher or lower than the first value for an area that has a good field surface condition.

Also, in the above embodiment, the first value is set to 4. However, the present invention is not limited to this, and the first value may be a value other than 4.

(21) The traveling reaping path LI may be a straight path, or may be a curved path.

(22) The present invention may be configured as a combine control program that causes a computer to realize the functions of units in the above embodiment. The present invention may also be configured as a recording medium having stored therein a combine control program that causes a computer to realize the functions of units in the above embodiment. The present invention may furthermore be configured as a combine control method in which the processing of units in the above embodiment is performed through a plurality of steps.

INDUSTRIAL APPLICABILITY

The present invention is applicable to not only a normal-type combine, but also to an autodetachable-type combine. The present invention is also applicable to various harvesters such as a corn harvester, a potato harvester, a carrot harvester, and a sugar cane harvester.

Moreover, the present invention is also applicable to various agricultural work vehicles such as various harvesters, such as a corn harvester, a potato harvester, a carrot harvester, and a sugar cane harvester, a planter, and a tractor.

DESCRIPTION OF REFERENCE SIGNS

First Embodiment

1 combine (harvester)
11 traveling device
14 grain tank (crop tank)
24 maximum weight calculation unit
25 unit harvest weight calculation unit
27 maximum travel distance calculation unit
31 accumulation height detection unit
32 weight detection unit
35 moisture detection unit
H harvesting device Second Embodiment

101 combine (agricultural work vehicle)
153 information acquisition unit
154 turning speed control unit
155 management server Third Embodiment 201 combine
214 grain tank
225 detection unit
226 acquisition unit
227 determination unit
228 discharge control unit
230 maximum value reducing unit
A combine control system
AR actual turning radius
LU U-turn path (turning path)
TR target turning radius

The invention claimed is:

1. A harvester that includes a harvesting device for harvesting a crop in a field and a traveling device, and that is capable of performing traveling harvesting in which the crop in the field is harvested with use of the harvesting device while traveling with use of the traveling device, the harvester comprising:

a crop tank configured to store the crop harvested by the harvesting device;

a weight detection unit configured to detect a storage weight, which is a value that indicates a weight of the crop stored in the crop tank;

a maximum weight calculation unit configured to calculate a maximum weight during harvesting work, the maximum weight being a value that indicates a weight of the crop at a maximum storage amount of the crop tank;

a unit harvest weight calculation unit configured to calculate a unit harvest weight, which is a weight of the crop harvested per unit of harvest-travel distance;

a maximum travel distance calculation unit configured to calculate a maximum travel distance, which is a maximum distance that can be traveled during the traveling harvesting before an amount of the crop stored in the crop tank reaches the maximum storage amount, based on the storage weight detected by the weight detection unit, the maximum weight calculated by the maximum weight calculation unit, and the unit harvest weight calculated by the unit harvest weight calculation unit; and an accumulation height detection unit configured to detect an accumulation height of the crop stored in the crop tank, wherein the maximum weight calculation unit calculates the maximum weight by dividing the storage weight detected by the weight detection unit by a ratio of the accumulation height detected by the accumulation height detection unit to a maximum value of the accumulation height.

* * * * *